(12) United States Patent
Shimodaira et al.

(10) Patent No.: US 8,098,228 B2
(45) Date of Patent: Jan. 17, 2012

(54) DRIVING METHOD OF ELECTROPHORETIC DISPLAY DEVICE

(75) Inventors: Yasuhiro Shimodaira, Fujimi (JP); Hiroshi Maeda, Suwa (JP)

(73) Assignee: Seiko Epson Corporation (JP)

( * ) Notice: Subject to any disclaimer, the term of this patent is extended or adjusted under 35 U.S.C. 154(b) by 653 days.

(21) Appl. No.: 12/276,580

(22) Filed: Nov. 24, 2008

(65) Prior Publication Data

US 2009/0146991 A1 Jun. 11, 2009

(30) Foreign Application Priority Data

Dec. 6, 2007 (JP) .................................. 2007-315720
Sep. 26, 2008 (JP) .................................. 2008-247700

(51) Int. Cl.
*G09G 3/34* (2006.01)

(52) U.S. Cl. ...................................................... 345/107
(58) Field of Classification Search .................. 345/107, 345/214; 359/296; 450/31, 32, 36
See application file for complete search history.

(56) References Cited

U.S. PATENT DOCUMENTS

| | | | | | |
|---|---|---|---|---|---|
| 4,810,059 | A | * | 3/1989 | Kuijk ................................ | 345/91 |
| 5,066,946 | A | * | 11/1991 | Disanto et al. ................. | 345/107 |
| 2006/0181492 | A1 | * | 8/2006 | Gates et al. ...................... | 345/84 |
| 2008/0238867 | A1 | | 10/2008 | Maeda et al. | |

FOREIGN PATENT DOCUMENTS

| | | | |
|---|---|---|---|
| JP | 2003-084314 | * | 3/2003 |
| JP | 2008-268853 | | 11/2008 |

* cited by examiner

*Primary Examiner* — Quan-Zhen Wang
*Assistant Examiner* — David Lee
(74) *Attorney, Agent, or Firm* — Harness, Dickey & Pierce, P.L.C.

(57) ABSTRACT

A driving method of an electrophoretic display device composed of a pair of substrates with electrophoretic elements, each containing electrophoretic particles, interposed therebetween, first electrodes provided on one substrate of the pair of substrates so as to correspond to pixels, and a second electrode which is provided on the other substrate and is shared by all of the pixels, in which each pixel includes a pixel switching element connected to a scan line and a data line, a memory circuit connected to the pixel switching element, and a switch circuit disposed between the memory circuit and the first electrode, and the switch circuit is connected to a first control line and a second control line, the driving method includes: inputting an image signal to the memory circuit via the pixel switching element; causing the first control line and the second control line to be connected to the first electrode by driving the switch circuit in response to an output from the memory circuit; causing a potential of the second electrode to alternate between a first potential and a second potential in a state in which a potential of the first control line is set to the first potential and a potential of the second control line is set to the second potential; and setting the potential of the first control line to a third potential which is higher than the first potential in an image display step which is performed after the inputting an image signal.

10 Claims, 13 Drawing Sheets

DRIVING METHOD OF ELECTROPHORETIC DISPLAY DEVICE

BACKGROUND

1. Technical Field

The present invention relates to a driving method of an electrophoretic display device.

2. Related Art

An electrophoretic display device includes a plurality of first electrodes (pixel electrodes), a second electrode facing the plurality of first electrodes, and electrophoretic elements interposed between the electrodes. To display an image by the electrophoretic display device, image signals are supplied to memory circuits via switching elements and stored in the memory circuits first. The image signals stored in the memory circuits are input to the first electrodes, and a potential difference occurs between each of the first electrodes and the second electrode applied with a predetermined potential when a potential is applied to the first electrodes.

JP-A-2003-84314 disclosed a structure of the memory circuit. The memory circuit may be an SRAM type using static random access memories (SRAMs) or a dynamic random access type (DRAM type) DRAM type using condensers.

When displaying an image by an electrophoretic display device, a sufficient potential difference must be given to the electrodes interposing the electrophoretic element therebetween so that electrophoretic particles can migrate to either one electrode of the first electrode or the second electrode. Accordingly, a power source voltage of the memory circuit must be 10V or higher. At this time, in the case in which neighboring pixels display different colors, the first electrodes (pixel electrodes) of the neighboring pixels are applied with different potentials from each other.

Accordingly, there is a large potential difference between the potentials applied to the first electrodes of the neighboring pixels, and therefore there is the possibility that a leak current flows across the neighboring first pixels via an adhesive used for fixing the electrophoretic elements to a substrate. Although the leak current for only a single pixel is small, the total leak current of the entire electrophoretic display device is very large, resulting in the increase of power consumption.

Further, there is the possibility that the first electrodes cause chemical reactions by the leak current, which is likely to result in deterioration of reliability as the electrophoretic display device. For example, a material, such as platinum which is chemically stable and has the high anti-erosion property is used as the first electrodes to improve the reliability. However, such a method brings about a problem with the increase of manufacturing cost.

As means for solving the above-mentioned problems, JP-A-2007-087666 discloses an electrophoretic display device in which a potential of the pixel electrode can be controlled by a switching circuit. According to this electrophoretic display device, it is possible to suppress the leak current and can control a display by using a control line.

SUMMARY

An advantage of some aspects of the invention is to improve the known electrophoretic display device which enables a sequential display using the same circuit structure as the known electrophoretic display devices.

According to one aspect of the invention, there is provided a driving method of an electrophoretic display device composed of a pair of substrates with electrophoretic elements, each containing electrophoretic particles, interposed therebetween, first electrodes provided on one substrate of the pair of substrates so as to correspond to pixels, and a second electrode which is provided on the other substrate and is shared by all of the pixels, in which each pixel includes a pixel switching element connected to a scan line and a data line, a memory circuit connected to the pixel switching element, and a switch circuit disposed between the memory circuit and the first electrode, and the switch circuit is connected to a first control line and a second control line, the driving method including: inputting an image signal to the memory circuit via the pixel switching element; causing the first control line and the second control line to be connected to the first electrode by driving the switch circuit in response to an output from the memory circuit; causing a potential of the second electrode to alternate between a first potential and a second potential in a state in which a potential of the first control line is set to the first potential and a potential of the second control line is set to the second potential; and setting the potential of the first control line to a third potential which is higher than the first potential in an image display step which is performed after inputting an image signal.

According to the invention, it is possible to suppress the leak current between the pixels by controlling the first control line and the second control line, so that reliability of the product can be improved. In addition, according to the invention, since the electrophoretic elements is driven by the potential difference between the electrodes, it is possible to change the display in accordance with the data input. Therefore, it is possible to sequentially display the image without heavily increasing the circuit scale.

In the driving method of an electrophoretic display device, it is preferable that the pixels are arranged in a matrix, and the potential of the second electrode changes in synchronous with the inputting of an image signal with respect to the pixels belonging to a single line or a plural number of lines in the matrix of the plurality of pixels in inputting an image signal.

According to this invention, in the image signal inputting step, the plurality of pixels are arranged in a matrix and the potential of the second electrode is changed in synchronous with the inputting of the image signal in the pixels belonging to a single line or a plural number of lines of the plurality of pixels. Accordingly, writing of an image is performed in the unit of a single line or a plural number of lines at a time. Accordingly, it is possible to prevent only a portion of the pixels belonging to the single line or the plural number of lines from performing a display when writing data into data lines. Further, updating of the display of the pixels into which the image signals are input can be performed for every single line.

In the driving method of an electrophoretic display device, it is preferable that a potential of the first electrode changes from the second potential to the first potential when a potential of the second electrode is the first potential, and the potential of the first electrode changes from the first potential to the second potential when the potential of the second electrode is the second potential, in the inputting an image signal.

According to this invention, since the potential of the first electrode changes from the second potential to the first potential when the potential of the second electrode is the first potential in the step of inputting an image signal, it is not recognized that the image changes until the potential level of the second electrode changes in a period of inputting an image data signal into data lines. In conclusion, since the electrophoretic elements are not driven while the image signal is updated, it is possible to prevent an unexpected display from being performed.

According to another aspect of the invention, there is provided driving method of an electrophoretic display device composed of a pair of substrates with electrophoretic elements, each containing electrophoretic particles, interposed therebetween, first electrodes provided on one substrate of the pair of substrates so as to correspond to pixels, and a second electrode which is provided on the other substrate and is shared by all of the pixels, in which each pixel includes a pixel switching element connected to a scan line and a data line, a memory circuit connected to the pixel switching element, and a switch circuit disposed between the memory circuit and the first electrode, and the switch circuit is connected to a first control line and a second control line, the driving method comprising: inputting an image signal to the memory circuit via the pixel switching element; causing the first electrode to be connected to the first control line or the second control line by driving the switch circuits in response to an output from the memory circuit; and setting a potential of the second electrode to a midway potential between a first potential and a second potential in a state in which a potential of the first control line is set to the first potential and a potential of the second control line is set to the second potential.

According to this invention, it is possible to improve the reliability of a product by suppressing the leak current flowing across the pixels by controlling the first control line and the second control line. Further, since the electrophoretic elements are driven by generating a potential difference between the electrodes, it is possible to change a display with the lapse of time after the data inputting. Accordingly, it is possible to sequentially display images without significantly increasing the size of the circuit. In addition, since the potential of the second electrode is set to the midway potential between the first potential and the second potential, it is possible to display halftone, such as gray, in a monochrome display.

In the driving method of an electrophoretic display device, it is preferable that the potential of the second electrode varies within a range of ±30% with respect to the midway potential between the first potential and the second potential.

According to this invention, since the potential of the second electrode changes within the range of ±30% of the midway potential between the first potential and the second potential, it is possible to display halftone, such as gray when performing a monochrome display. In the case in which the potential of the second electrode is set to the midway potential between the first potential and the second potential, it is possible to obtain the best potential balance. Further, it is possible to sufficiently vary the potential in the range of ±30% thanks to the characteristic of the electrophoretic display device.

In the driving method of an electrophoretic display device, it is preferable that the electrophoretic display device is provided with a touch panel, the image signal includes a touch panel signal which changes the potential of the first electrode at a contact position on the touch panel, and the touch panel signal is supplied to the memory circuit in inputting an image signal.

According to this invention, since the electrophoretic display device which can sequentially displays images is provided with a touch panel, it is possible to perform display rewrite of the electrophoretic display device in real time so as to trace a touch panel signal. For such a reason, it is possible to display intuitively using the touch panel.

In the driving method of an electrophoretic display device, it is preferable that the touch panel signal is selected from a first touch panel signal which sets the potential of the first electrode to be higher than the potential of the second electrode and a second touch panel signal which sets the potential of the first electrode to be lower than the potential of the second electrode.

According to this invention, it is possible to switch a black display rewrite to a white display rewrite or vice versa by the first touch panel signal and the second touch panel signal. With this method, colorful display can be achieved.

In the driving method of an electrophoretic display device, it is preferable that the touch panel signal is supplied in a state in which the potential of the second electrode and the potential of the first control line are set to the same level in the inputting an image signal.

According to this invention, it is possible to selectively perform data write with respect to a portion in which write is performed newly. With this method, it is possible to reduce power consumption and therefore it is possible to realize fast writing.

In the driving method of an electrophoretic display device, it is preferable that a plurality of scan lines is arranged in a first direction, and scan signals are supplied in turns to the plurality of scan lines in the same direction as a shift direction of the contact position in the case in which the contact position is shifted during the inputting an image signal.

According to this invention, it is possible to perform a scan so as to trace the change of a contact position and therefore it is possible to improve response time of a display write and write a display in real time.

In the driving method of an electrophoretic display device, it is preferable that a plurality of data lines is arranged in a second direction, and the touch panel signals are simultaneously supplied to the plurality of data lines.

According to this invention, it is possible to reduce the time rag from the shift of the contact position to the display change so that the time rag is very short.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
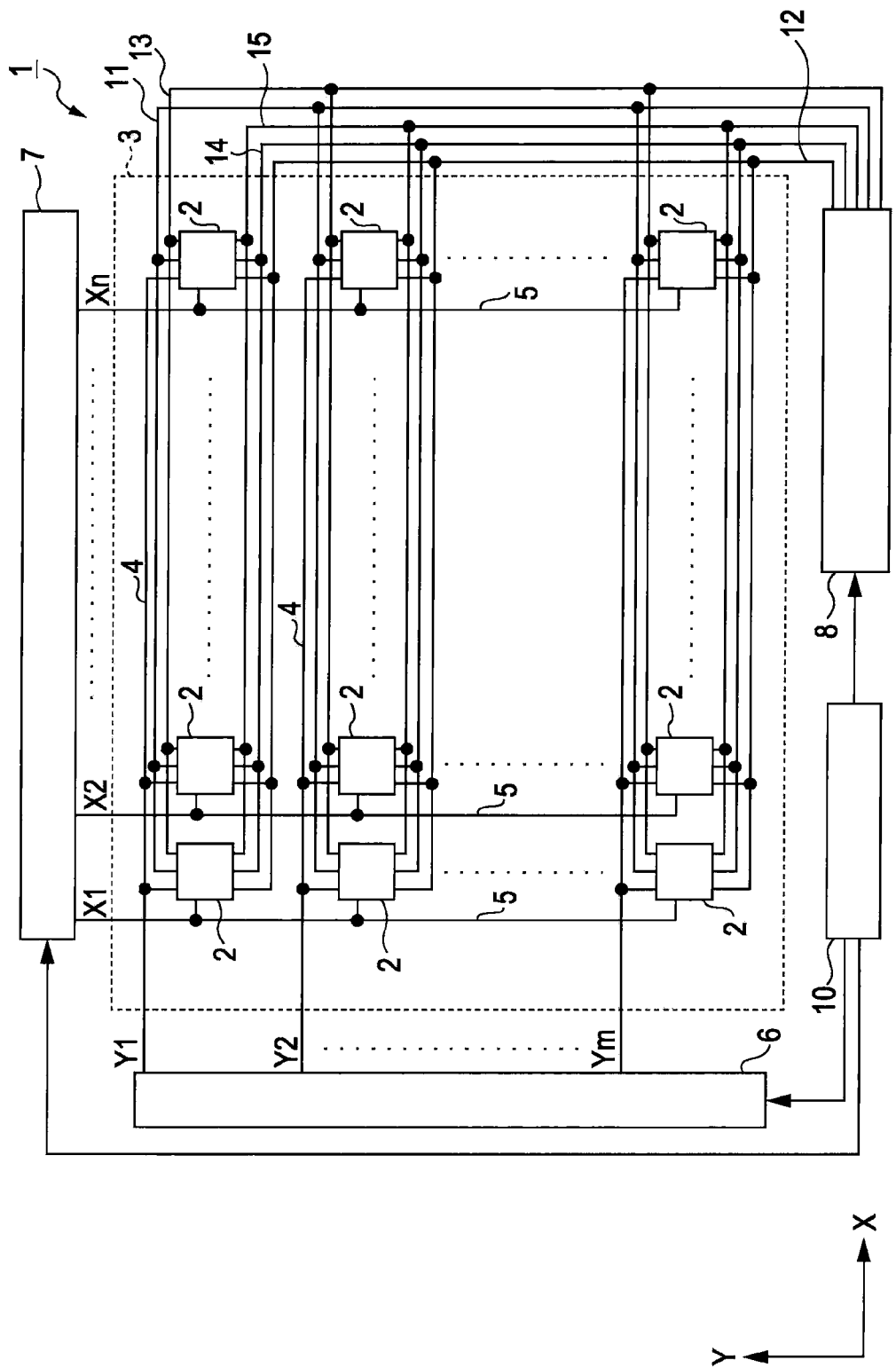
FIG. 1 is a structural view illustrating an electrophoretic display device.

Hereinafter, an electrophoretic display device 1 according to embodiments of the invention will be described with reference to the accompanying drawings. FIG. 1 shows a structure of the electrophoretic display device 1 according to one embodiment of the invention. The electrophoretic display device 1 includes a display portion 3, a scan line drive circuit (pixel driving portion) 6, a data line drive circuit (pixel driving portion) 7, a common power source modulation circuit (potential control portion) 8, and a controller 10.

The display portion 3 is provided with pixels 2 which are arranged in an M×N matrix (M in a Y axis direction and N in an X direction). The scan line drive circuit 6 is connected to the pixels 2 via a plurality of scan lines 4 (Y1, Y2, . . . , and Ym), each extending in the X direction of the display portion 3. The data line drive circuit 7 is connected to the pixels 2 via a plurality of data lines 5 (X1, X2, . . . , and Xn), each extending in the Y direction of the display portion 3. The common power source modulation circuit 8 is connected to the pixels via a first control line 11, a second control line 12, a high potential power source line 13, a low potential power source line 14, and a common electrode power source wiring 15. The scan line drive circuit 6, the data line drive circuit 7, and the common power source modulation circuit 8 are controlled by the controller 10. The first control line 11, the second control line 12, the high potential power source line 13, the low potential power source line 14, and the common electrode power source wiring 15 are common wirings for all of the pixels 2.

Next, a detailed structure of the pixel 2 will be described with reference to FIG. 2.

Figure 2:
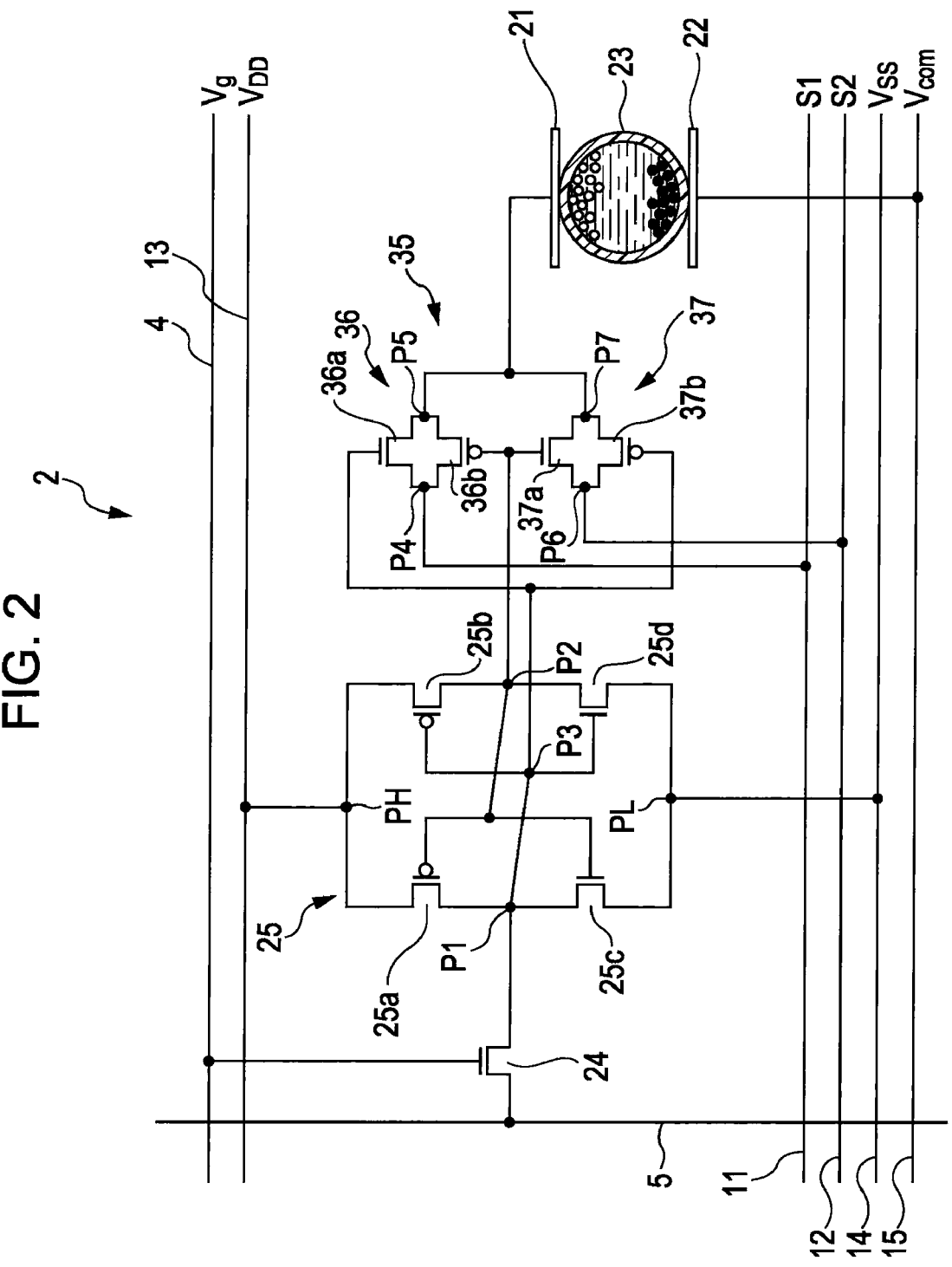
FIG. 2 is a view illustrating a circuit structure of a pixel.

As shown in FIG. 2, the pixel 2 is composed of a drive TFT (pixel switching element) 24, an SRAM (memory circuit) 25, a switch circuit 35, a pixel electrode 21, a common electrode 22, and an electrophoretic element 23.

The drive TFT 24 is composed of a negative metal oxide semiconductor transistor (N-MOS transistor). A gate electrode, a source electrode, and a drain electrode of the drive TFT 24 are connected to the scan line 4, the data line 5, and a data input terminal P1 of the SRAM 25, respectively.

The SRAM 25 is a complementary metal oxide semiconductor type (C-MOS type) SRAM, and composed of two positive metal oxide semiconductor (P-MOS) transistors 25a and 25b, two N-MOS transistors 25c and 25d.

A source electrode and a source electrode of the P-MOS transistor 25a are connected to a high potential terminal PH and a data input terminal P1, respectively. Further, a gate electrode of the P-MOS transistor 25a is connected to a gate electrode of the N-MOS transistor 25c and a data output terminal P2. The high potential terminal PH is connected to the high potential power source line 13.

A source electrode and a drain electrode of the P-MOS transistor 25b are connected to the high potential terminal PH and a data output terminal P2, respectively. A gate electrode of the P-MOS transistor 25a is connected to a gate electrode of the N-MOS transistor 25d and a data input terminal P3.

A source electrode and a drain electrode of the N-MOS transistor 25c are connected to a low potential terminal PL and the data input terminal P1, respectively. A gate electrode of the N-MOS transistor 25c is connected to the gate electrode of the P-MOS transistor 25a and the data output terminal P2. The low potential terminal PL is connected to the low potential power source line 14.

A source electrode and a drain electrode of the N-MOS transistor 25d are connected to the low potential terminal PL and a first data output terminal P2, respectively. A gate electrode of the N-MOS transistor 25d is connected to the gate electrode of the P-MOS transistor 25b and the data output terminal P3. The data input terminal P1 and the data output terminal P3 are connected to each other.

As described above, the SRAM 25 is a single-input, single-output memory circuit for storing one bit of image data. When an image signal which defines image data "1", i.e. the image signal with a high level is input into the data input terminal P1, a low level signal is output from the data output terminal P2.

The switch circuit 35 is composed of a first transmission gate 36 and a second transmission gate 37. The first transmission gate 36 is composed of an N-MOS transistor 36a and a P-MOS transistor 36b. Further, source electrodes of the N-MOS transistor 36a and P-MOS transistor 36b are connected to the first control line 11 via a signal input terminal P4, and drain electrodes of the N-MOS transistor 36a and P-MOS transistor 36b are connected to are connected to the pixel electrode 21 via a signal output terminal P5. Still further, a gate electrode of the N-MOS transistor 36a is connected to the data output terminal P3 of the SRAM 25 and a gate of the P-MOS transistor 36b is connected to the data output terminal P2 of the SRAM 25.

The second transmission gate 37 composed of an N-MOS transistor 37a and a P-MOS transistor 37b. Source electrodes of the N-MOS transistor 37a and the P-MOS transistor 37b are connected to the second control line 12 via a signal input terminal P6, and drain electrodes of the N-MOS transistor 37a and the P-MOS transistor 37b are connected to the pixel electrode 21 via a signal output terminal P7. A gate electrode of the N-MOS transistor 37a is connected to the data output terminal P2 of the SRAM 25 and a gate electrode of the P-MOS transistor 37b is connected to the data output terminal P3 of the SRAM 25.

In the case in which the image data "1" is stored in the SRAM 25 and a low level signal is output from the data output terminal P2, the first transmission gate 36 is switched on and therefore a first drive signal S1 supplied to the signal input terminal P4 via the first control line 11 is supplied to the pixel electrode 21 from the signal output terminal P5. Conversely, in the case in which the image data "0" is stored in the SRAM 25 and a high level signal is output from the data output terminal P2, the second transmission gate 37 is switched on and therefore a second drive signal S2 supplied to the signal input terminal P6 via the second control line 12 is supplied to the pixel electrode 21 from the signal output terminal P7.

The pixel electrode 21 is made of aluminum Al and applies a voltage to the electrophoretic element 23. The pixel electrode 21 is also electrically connected to the signal output terminal P5 of the first transmission gate 36 and the signal output terminal P7 of the second transmission gate 37. The common electrode 22 functions as an opposing electrode of the pixel electrode 21 and is a transparent electrode made of magnesium-silver (MgAg), indium tin oxide (ITO), or indium zinc oxide (IZO). The common electrode 22 is supplied with a common potential $V_{com}$. The electrophoretic element 23 is interposed between the pixel electrode 21 and the common electrode 22 and displays an image by electric field generated by a potential difference between the pixel electrode 21 and the common electrode 22.

Figure 3:
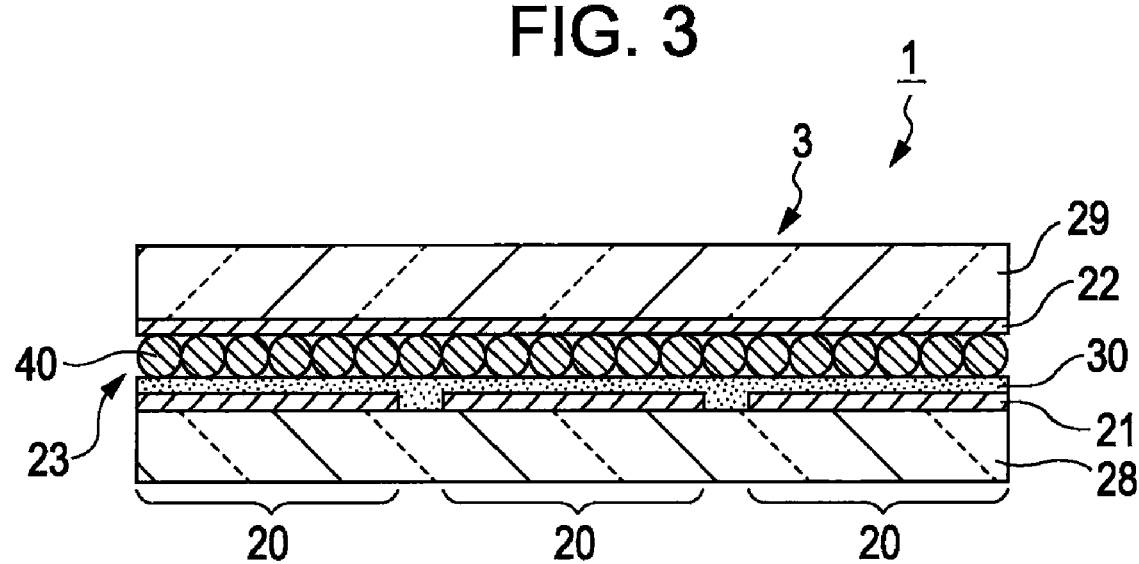
FIG. 3 is a sectional view illustrating a display portion of an electrophoretic display device.

FIG. 3 is a partial sectional view illustrating a display portion 3 of the electrophoretic device 1. The electrophoretic display device 1 has a structure in which the electrophoretic elements 23 composed of a plurality of microcapsules 40 are interposed between an element substrate 28 and an opposing substrate 29.

In the display portion 3, the pixel electrodes 21 are arranged on the electrophoretic element 23 side surface of the element substrate 28, and the electrophoretic elements 23 are connected to the pixel electrodes 21 via an adhesive layer 30. Further, the common electrode 22 which is a plane shape and faces the pixel electrodes 21 are formed on the electrophoretic element 23 side surface of the opposing substrate 29. On the common electrode 22 is provided the electrophoretic elements 23.

The element substrate 28 is a substrate made of glass or plastic and may not be a transparent substrate because it is placed on the opposite side of an image display surface. Although illustration is omitted, the scan lines 4, the data lines 5, the pixel switching elements 24, the latch circuit 25, and the switch circuits 35 which are shown in FIG. 1 and FIG. 2 are formed between the pixel electrodes 21 and the element substrate 28.

The opposing substrate 29 is a substrate made of glass or plastic and is a transparent substrate because it is placed on the image display side. The common electrode 22 formed on the opposing substrate 29 is made of a transparent conductive material, such as MgAs, ITO, or IZO.

The electrophoretic element 23 is formed on the opposing substrate 29 first, and is generally regarded as an electrophoretic sheet which includes the adhesive layer 30. A separation paper for protection is attached to the adhesive layer 30 side.

In a manufacturing method, the display portion 3 is formed by attaching the electrophoretic sheet, from which separation paper is peeled off, to the element substrate 28 on which the pixel electrodes 21 and the circuits are formed and which is separately manufactured. Accordingly, the adhesive layer 30 exists only on the pixel electrode 21 side.

Figure 4:
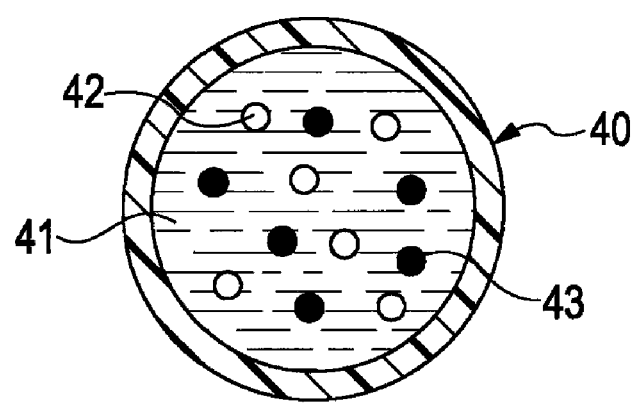
FIG. 4 is a structural view illustrating a micro capsule.

FIG. 4 is a schematic sectional view illustrating the microcapsule 40. The microcapsule 40 has a grain size (diameter) of about 50 μm. The microcapsule 40 is a spherical body containing a dispersion medium 41, a plurality of white particles (electrophoretic particles) 42, and a plurality of black particles (electrophoretic particles) 43 therein. The microcapsule 40, as shown in FIG. 3, is interposed between the common electrode 22 and the pixel electrode 21, and a single microcapsule 40 or a plurality of microcapsules 40 are placed in a single pixel 20.

A shell region (wall film) of the microcapsule 40 is made of acryl resin, such as polymethylmethacrylate and ethyl methacrylate, a transparent polymer resin, such as urea resin and Arabic rubber.

The dispersion medium 41 is a liquid obtained by dispersing the white particles 42 and the black particles 43 in the microcapsule 40. The dispersion medium 41 may be water, alcohol-based solvent (methanol, ethanol, isopropanol, butanol, octanol, and methyl cellosolve), a variety of esters (acetic ethyl and acetic butyl), ketone (acetone, methylethylketone, and methylisobutylketone), aliphatic hydrocarbon (pentane, hexane, and octane), cycloaliphatic hydrocarbon (cyclohexane and methylcyclohexane), aromatic hydrocarbon (benzene, toluene, a benzene derivative having a long-chain alkyl group (xylene, hexylbenzene, heptane, hebuthylbenzene, octylbenzene, nonylbenzene, decylbenzene, undecylbenzene, dodecylbenzene, tridecylebenzene, and tetradecylbenzene), halogenated hydrocarbon (methylene chloride, chloroform, carbon tetrachloride, and 1,2-dichloroethane), carboxylate, and other kinds of oils. These materials can be used in the form of a single material or a mixture. Further, surfactant may be added to the above.

The white particles 42 are particles (polymer or colloid) composed of white pigment, such as titanium dioxide, zinc oxide, and antimony trioxide, and are charged negative. The black particles 43 are particles (polymer or colloid) composed of black pigment, such as aniline black and carbon black, and are charged positive.

If it is necessary, a charge control agent composed of electrolyte, surfactant agent, metallic soap, resin, rubber, oil, varnish, and particles such as compounds; a dispersant agent, such as a titanium-based coupling agent, an aluminum-based coupling agent, a silane-based coupling agent; a lubricant, and a stabilizer can be added to these pigments.

Next, with reference to FIGS. 1, 2, 5, and 6, a driving method of the electrophoretic display device 1 and operation of the electrophoretic element 23 will be described.

Figure 5:
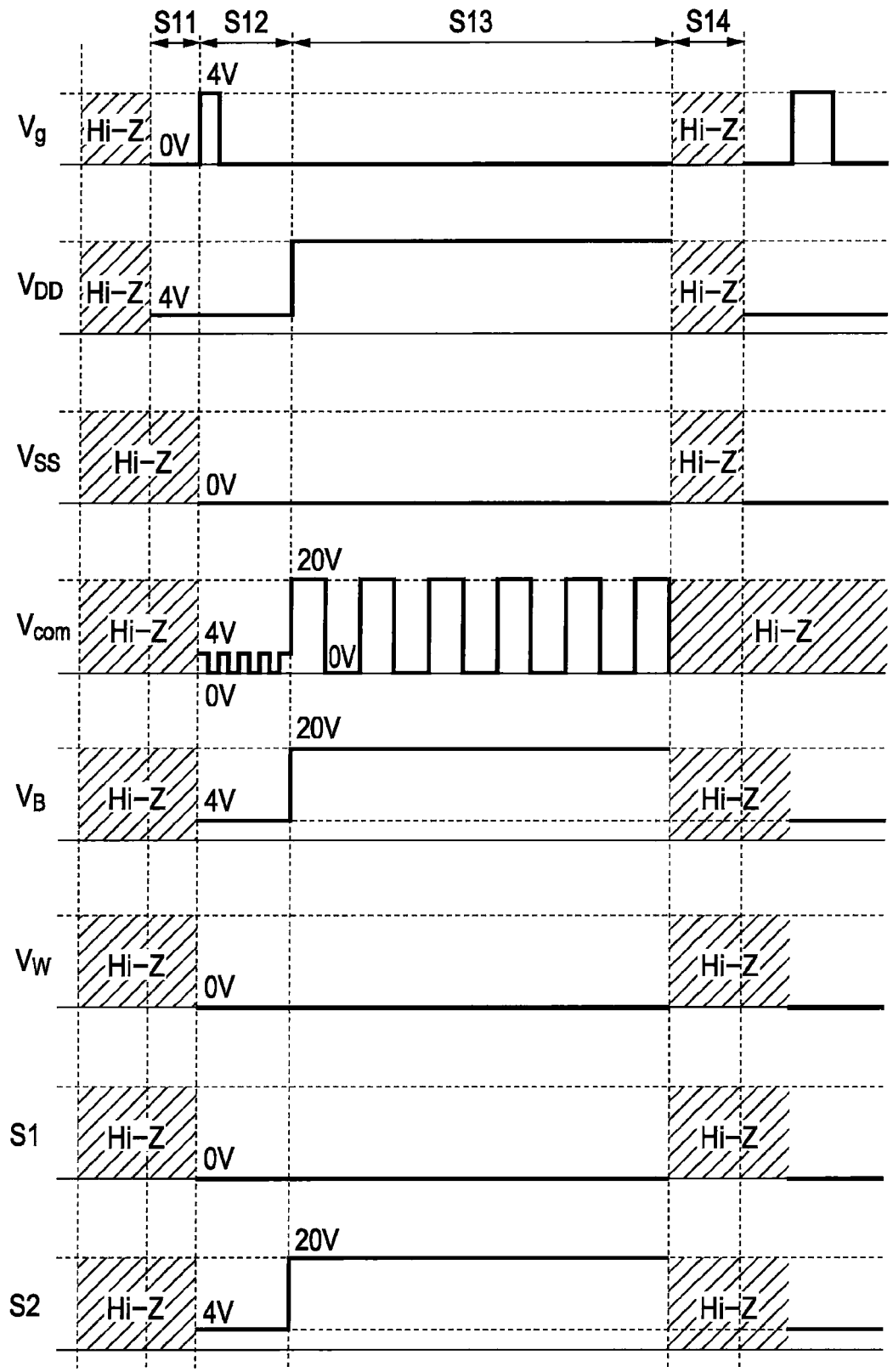
FIG. 5 is a view illustrating a timing chart relating to a driving method of an electrophoretic display device.

FIG. 5 is a timing chart illustrating the driving method of an electrophoretic display device 1. FIG. 6 is a view for explaining in detail operation of the white particles 42 and the black particles 43 shown in FIG. 5.

In the following description, pixels 20B displayed with black and pixels 20W displayed with white of the pixels 20 arranged in the display portion 3 will be described. Accordingly, in FIGS. 5 and 6, additional characters "B" and "W" follow each of reference numerals. These additional characters are used only for showing each of elements denoted by the references belongs to either the pixels 20B or the pixels 20W.

FIG. 5 shows a potential change with the time with respect to the scan lines 4, the high potential power source line 13, the low potential power source line 14, the common electrode 22, pixel electrodes 21B of the pixels 20B, and pixel electrodes 21W of the pixels 20W shown in FIG. 2. $V_g$, $V_{DD}$, $V_{ss}$, $V_{com}$, $V_B$, and $V_W$ in FIG. 5 denote a potential of the scan lines 4, a potential of the high potential power source line 13, a potential of the low potential power source line 14, a potential of the common electrode 22, a potential of the pixel electrodes 21B, and a potential of the pixel electrodes 21W, respectively. "HiZ" shown in FIG. 5 denotes a high impedance state which is electrically short-circuited state.

FIG. 6 shows operation characteristics of white particles 42 and black particles 43 in the white-display pixels 20W and the black-display pixels 20B.

Potentials of the high level and the low level will be described in detail. These potential values are examples, but may vary.

First, at Step S11 of FIG. 5, each of wirings of the pixel 20 is electrically connected to a driving circuit, and therefore the pixel 20 is in a state in which the pixel 20 can be applied with a signal. In greater detail, the low level (0V) is supplied to the scan line 4, the high level (4V) is supplied to the high potential power source line 13, and the low level (0V) is supplied to the lower potential power source line 14. Accordingly, the latch circuit 25 becomes ON state and the pixel 20 drops into a state in which it can memorize the pixel data input from the data line 5.

Next, in Step S12 (image signal inputting step), a selection signal (high level of 4V) is input to the scan line 4 for a predetermined period. At this time, the pixel switching element 24 is turned on, the image data is input into the latch circuit 25 from the data line 5, and the latch circuit 25 stores the input image data. In the black-display pixel 20B, the low level is input as the image data, the high level is output from the output terminal P2 of the latch circuit 25, and the second transmission gate 37 is turned on. With this operation, the high level (4V) of the second control line 12 is applied to the pixel electrode 21B.

On the other hand, in the white-display pixel 20W, the high level is input as the image data, the low level is output from the output terminal P2 of the latch circuit 25, and the first transmission gate 36 is turned on. With this operation, the low level (0V) of the first control line 11 is applied to the pixel electrode 21W.

After that, in Step S13, the potential of the high potential power source line 13 is raised to 20V from 4V, and the potential of the low potential power source line 14 is 0V. With this operation, in the black-display pixel 20B, the potential output from the output terminal P2 of the latch circuit 25B is raised to the high level (20V). In the black-display pixel 20B, the low level is input as the image data, the high level is output from the output terminal P2 of the latch circuit 25, and the second transmission gate 37 is turned on. With this operation, the high level (20V) of the second control line 12 is applied to the pixel electrode 21B, and the potential of the pixel electrode 21B is raised to 20V from 4V. Further, in the white-display pixel 20W, the high level is input as the image data, the low level is output from the output terminal P2 of the latch circuit 25, and the first transmission gate 36 is turned on. With this operation, the low level (0V) of the first control line 11 is applied to the pixel electrode 21W. Accordingly, the potential applied to the pixel electrode 21W is the low level and does not change as in the low level.

In Step S13, the common electrode 22 is applied with rectangular-shaped reference pulse by a plurality of periods in which a low level (0V) period and a high level (20V) period alternate (for example, by 4 periods in FIG. 6. Hereinafter, this driving method is referred to as "common swing drive." The common swing drive is a driving method in which a pulse in which the high level period H and the lower level L period alternate with each other is applied to the common electrode 22 for one or more periods during a period in which the display image is rewritten.

According to the common swing drive, it is possible to control the potential applied to the pixel electrode and the common electrode with two values, the high level H and the low level L. Accordingly, with this embodiment, it is possible to lower the driving voltage and simplify the circuit structure. In the case of using a thin film transistor (TFT) as the switching element of each of the pixel electrodes 21 (21B, 21W), this embodiment is advantageous in that it is possible to ensure reliability of the TFT by the lower voltage driving.

When the image display operation is finished in Step S13, Step S14 is performed. In step S14, the high potential power source line 13, the lower potential power source line 14, and the scan line 4 drop into the high impedance state, and therefore each circuit is turned off. Accordingly, the pixel electrodes 21W and 21B also become the high impedance state.

By steps S11 to S14, it is possible to perform a white display and a black display by the pixels 20. By repeating steps S11 to S14, it is possible to sequentially update the display image.

In this embodiment, in addition to the above-described driving method, an operation, in which a rectangular-shaped reference pulse in which the low level (0V) period and the high level (4V) period alternate with each other is input by a plurality of periods, is performed while the selection signal (high level of 4V) is input to the scan line 4 in Step S12. At this time, operations of the pixel 20B and the pixel 20W will be described referring to the operations of the pixel 20B and the pixel 20W in the common swing drive.

First, with reference to FIG. 6, operations of the pixels 20B and 20W according to the common swing drive will be described.

Figure 6A:
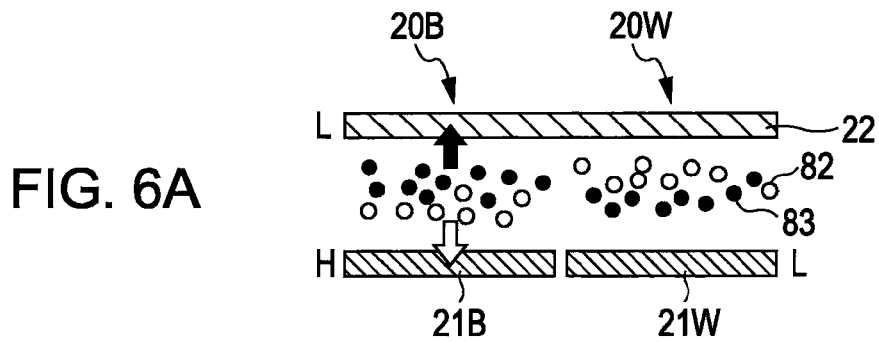
FIG. 6 is a view for explaining operation of an electrophoretic display device.

FIG. 6A shows the characteristics of the pixels when a low level (L; 0V) of the pulse of a first period is applied to the common electrode 22 in the common swing drive method. In the pixel 20B, a high level (H; 20V) is applied to the pixel electrode 21B, and a low level (L; 0V) is applied to the common electrode 22. Accordingly, electric field is formed between the pixel electrode 21B and the common electrode 22 in a longitudinal direction, and black particles 43 charged positive are drawn to the common electrode 22. On the other hand, the white particles 42 charged negative are drawn to the pixel electrode 21B. At this time, in the pixel 20W, since both of the common electrode 22 and the pixel electrode 21W are applied with the low level (L; 0V), electric field is not formed between these electrodes and therefore the particles do not migrate.

Figure 6B:
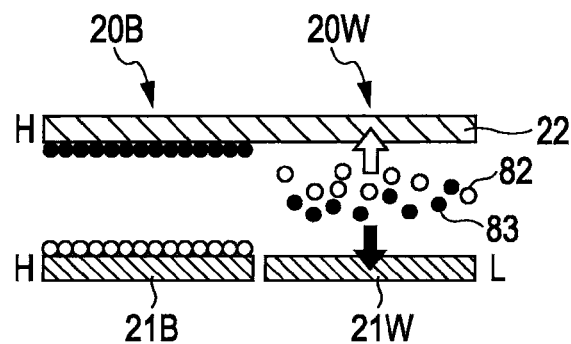

FIG. 6B shows the characteristics of the pixels when a high level (H; 20V) of the pulse of the first period is applied to the common electrode 22. In the pixel 20W, the pixel electrode 21W is applied with the low level (0V), and the common electrode 22 is applied with the high level (20V). Accordingly, the electric field is formed between the pixel electrode 21W and the common electrode 22 in the longitudinal direction, and the white particles 42 charged negative are drawn to the common electrode 22. On the other hand, the black particles 43 charged positive are drawn to the pixel electrode 21W. At this time, in the pixel 20B, both of the common electrode 22 and the pixel electrode 21B are applied with the high level (20V) and the electric field is not formed between the pixels. Accordingly, the particles do not migrate.

Figure 6C:
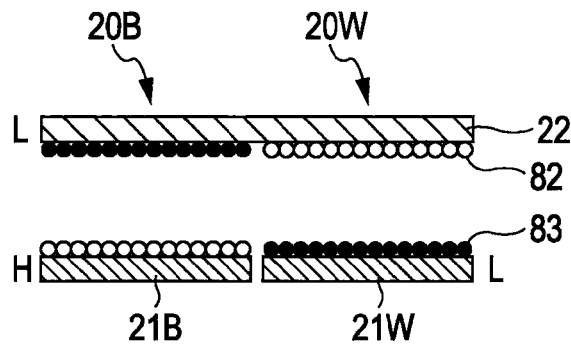

FIG. 6C shows the characteristics of the pixels after the pulse of the first period is applied to the pixels in the common swing drive method. In the pixel 20B, the black particles 43 gather near the common electrode 22 and the white particles 42 gather near the pixel electrode 21B. Accordingly, the black display is seen from the common electrode 22 side which serves a display surface. In the pixel 20W, the white particles 42 gather near the common electrode 22, and the black particles 43 gather near the pixel electrode 21W. Accordingly, the white display is seen from the common electrode 22 side which serves as the display surface.

Hereinabove, the driving characteristic of the pulse by the first period is described. Migration of the white particles 42 and the black particles 43 is apparently shown by performing such a drive by a plurality of periods, and therefore it is possible to improve the contrast. It is preferable that the number of periods and the frequency of the common swing drive, and specification and characteristic of the electrophoretic element may change. In the case in which the pigments used as the white particles 42 and the black particles 43 are replaced with red, green, and blue pigments, it is possible to display red, green, and blue colors in the display portion 3.

On the other hand, in the operation of inputting a rectangular-shaped reference pulse in which the low level (0V) and the high level (4V) alternate with each other by a plurality of periods to the common electrode 22 in Step S12, when the potential of the common electrode 22, to which the pulse-shaped signal is input, is 0V in the pixel 20B, the potential difference exists between the pixel electrode 21B and the common electrode 22, the black particles 43 are drawn to the common electrode 22, and the white particles 42 are drawn to the pixel electrode 21B. As a result, a black color is displayed by the pixels 20B. Further, the display of the pixels, with respect to which the write of the image signal is finished, is updated in synchronous with sequential selection of the scan lines Y1, Y2, . . . , and Ym (sequential display). In this driving method, since the potential difference between the pixel electrode 21B and the common electrode 22 is decreased in comparison with Step S14 and the generated electric field becomes weaker, migration of the black particles 43 and the white particles 42 slowly progresses in comparison with Step S13. As a result, gray which is close to black but not pure black comes to be displayed, but the display can look like black.

With respect to the pixel 20W, when the potential of the common electrode 22, to which a pulse-shaped signal is input, is 4V, the potential difference exists between the pixel electrode 21W and the common electrode 22, the white particles 42 are drawn to the common electrode 22, and the white particles 43 are drawn to the pixel electrode 21W. As a result, white is displayed by the pixel 20B. In synchronous with sequential section of the scan lines Y1, Y2, . . . , and Ym, the display of the pixels, into which the image signal is input, is updated (sequential display). With this driving method, since the potential difference between the pixel electrode 21W and the common electrode 22 is decreased in comparison with Step S13 and the electric field generated between the electrodes becomes weak, migration of the white particles 42 and the black particles 43 slowly progress in comparison with step S14. As a result, gray which is close to white but not pure white comes to be displayed, but the display can look like white.

Rewriting a Display Color

Next, an operation for rewriting a color displayed by each of the pixels will be explained.

Figure 7:
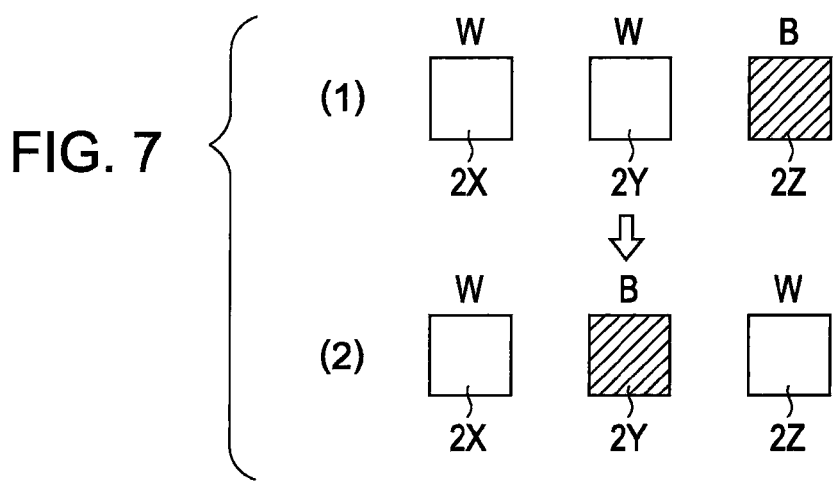
FIG. 7 is a plan view illustrating adjacent pixels.

FIG. 7 is a plan view schematically illustrating three pixels 2X, 2Y, and 2Z adjacent to one another of the pixels 2 in the display portion 3. With this embodiment, as shown in FIG. 7, state change from a state in which the pixel 2X displays white (W), the pixel 2Y displays white, and the pixel 2Z displays black (B) (hereinafter, referred to as "first state") to a state in which the pixel 2X displays white, the pixel 2Y displays black, and the pixel 2Z displays white (hereinafter, referred to as "second state") will be described.

Figure 8:
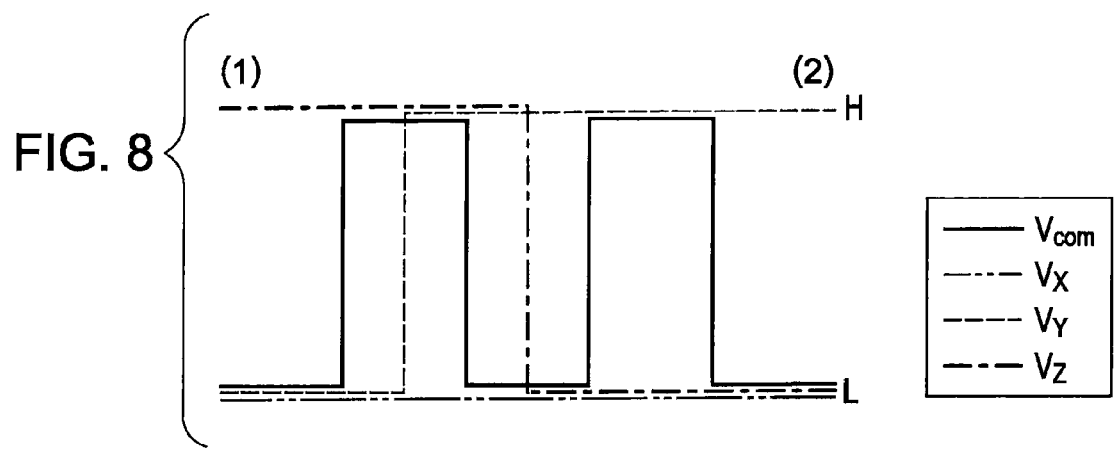
FIG. 8 is a plan view illustrating adjacent pixels.

FIG. 8 is a view showing waveforms of a signal supplied to the common electrode 22 and a signal supplied to the pixels 2X, 2Y, and 2Z in the image signal input period.

As shown in FIG. 8, the common electrode 22 is alternately and continuously supplied with a high level signal (H) and a low level signal (L) at every predetermined time ($V_{com}$). In the pixel 2X, the white display is continuously maintained over a time from the first state to the second state. Accordingly, the pixel electrode belonging to the pixel 2X is continuously supplied with the low level of the signal ($V_X$).

In the pixel 2Y, the display changes from the white display to the black display while the first state changes to the second state. Accordingly, with the pixel electrode belonging to the pixel 2Y, the state in which the signal of the low level is supplied changes to the state in which the signal of the high level ($V_Y$). As this signal changing timing, as shown in FIG. 8, it is preferable that the signal supplied to the common electrode 22 is in a high level period.

If the signal $V_Y$ supplied to the pixel electrode in this period changes from the low level to the high level, when the signal supplied to the common electrode 22 changes from the high level to the low level, the potential difference exists between the common electrode 22 and the pixel electrode of the pixel 2Y. Since the black particles 43 are drawn to the common electrode and the white particles 42 are drawn to the pixel electrode by the potential difference, the pixel 2Y displays a black color.

In the pixel 2Z, the black display changes to the white display while the first state changes to the second changes. Accordingly, the high level signal supply state changes to the low level signal supply state ($V_Z$) in the pixel electrode belonging to the pixel 2Z. As this signal changing timing, as shown in FIG. 8, it is preferable that the signal supplied to the common electrode 22 is in a low level period.

If the signal $V_Z$ supplied to the pixel electrode in this period changes from the high level to the low level, when the signal supplied to the common electrode 22 changes from the low level to the high level, the potential difference exists between the common electrode 22 and the pixel electrode of the pixel 2Z. Since the black particles 43 are drawn to the pixel electrode and the white particles 42 are drawn to the common electrode 22 by the potential difference, the pixel 2Z displays a white color.

Viewing the display portion as a whole, the image signal for updating only the pixels of which pixel electrodes change from the low level to the high level is written during the period in which the common electrode 22 has the high level, and the image signal for updating only the pixels of which pixel electrodes change from the high level to the low level is written during the period in which the common electrode 22 has the low level. Accordingly, the image signal for performing the black display is input when the common electrode 22 has the high level, and the image signal for performing the white display is input when the common electrode 22 has the low level.

As described above, with this embodiment, it is possible to suppress the leak current flowing across the pixels 2 and improve the reliability of products by controlling the first control line 11 and the second control line 12. In addition, according to this embodiment, the switch circuit 35 is driven on the basis of the output from the SRAM 25 in the image signal input period in which the image signal is input to the SRAM 25 via the driving TFT 24. Further, in the state in which the first control line 11 and the second control line 13 are connected to the pixel electrode 21 and therefore the potential of the first control line 11 becomes the high level and the potential of the second control line 12 becomes the low level, the potential of the common electrode 22 is alternated between the high level and the low level. With such an operation, it is possible to sequentially display images without bringing a problem in that the circuit size is greatly increased.

The technical scope of the invention is not limited to the above-mentioned embodiment but the embodiment may be modified within a range in which it is not departed from the purport of the invention.

Figure 9:
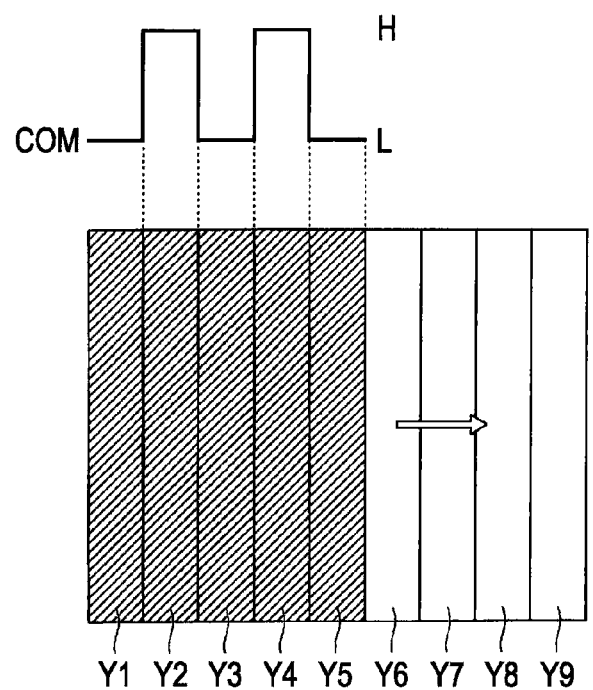
FIG. 9 is a view illustrating drive characteristics of an electrophoretic display device.
Figure 10:
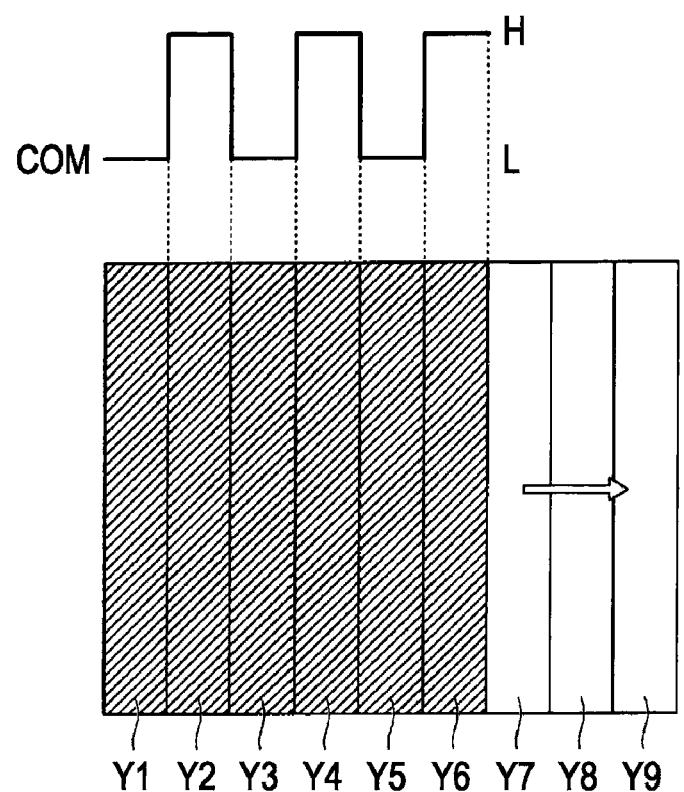
FIG. 10 is a view illustrating drive characteristics of an electrophoretic display device.

For example, as shown in FIGS. 9 and 10, the potential of the common electrode 22 may change in synchronous with the input of the image signal with respect to the pixel groups Y1 to Y9 belonging to a single line in the matrix of the pixels 2 of the display portion. FIGS. 9 and 10 show only part (pixel groups Y1 to Y9) of the display portion for convenience's sake of illustration. In FIGS. 9 and 10, the scan lines extend in the longitudinal direction of the figure (the scan lines extend in a lateral direction in FIG. 1). The pixel groups Y1 to Y9 correspond to references of the scan lines of FIG. 1. For example, in FIG. 9, the image signal is input to the SRAMs of the pixels belonging to the pixel groups Y1 to Y5. In the same figure, the common electrode 22 is supplied with the low level signal.

On the other hand, as shown in FIG. 10, the common electrode 22 is supplied with the image signal in synchronous with the inputting of the image signal with respect to the SRAMs of the pixels of the pixel group Y6. Although FIGS. 9 and 10 show the drive of the pixel group Y6, the same drive shown in these figures may be performed with respect to the other pixel groups of the pixel groups Y1 to Y9. With this drive, since the potential of the common electrode 22 corresponding to the pixel groups Y1 to Y9 alternates between the high level and the low level for every pixel group, the rewriting of the image is performed for every pixel group in the pixel groups Y1 to Y9. However, the change from the white display to the black display is displayed when the common electrode 22 becomes the high level after the image signal write, and the change from the black display to the white display is displayed when the common electrode 22 becomes the low level after the image write. Accordingly, it may look such that the updating of the display is performed for every two lines in the pixel groups Y1 to Y9. Further, the updating of the display may be in synchronous with the inputting of the image signal with respect to the pixel groups belonging to a plurality of lines in the pixels of the display portion.

Figure 11:
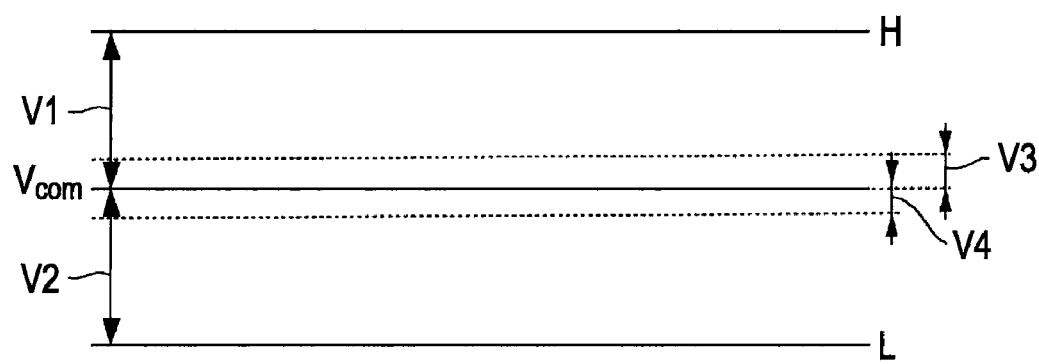
FIG. 11 is a view illustrating a signal waveform for driving an electrophoretic display device.

As shown in FIG. 11, it is preferable that the common electrode 22 is fixed to the potential within a range of ±30% of a midway potential between a high level potential and a low level potential supplied to the pixel electrode 21. In the case shown in FIG. 11, the signal $V_{com}$ supplied to the common electrode 22 is fixed to a potential within a range in which $V1=V2$, $V3 \leq 0.3 \times V1$, and $V4=0.3 \times V2$. Under such a condition, it is possible to display halftone, such as gray, when performing a monochrome display. Further, the display can be adjusted according to the characteristic (easiness to perform the white display and the black display) of the electrophoretic display device within the range of ±30% of the midway potential.

The potential of the common electrode 22 may not be limited to the range of ±30% of the midway potential, but be a midway potential between the high level H and the low level L. In such a case, it is possible to obtain the best potential balance.

Electronic Apparatus

Next, an electronic apparatus according to the invention will be described.

Figure 12A:
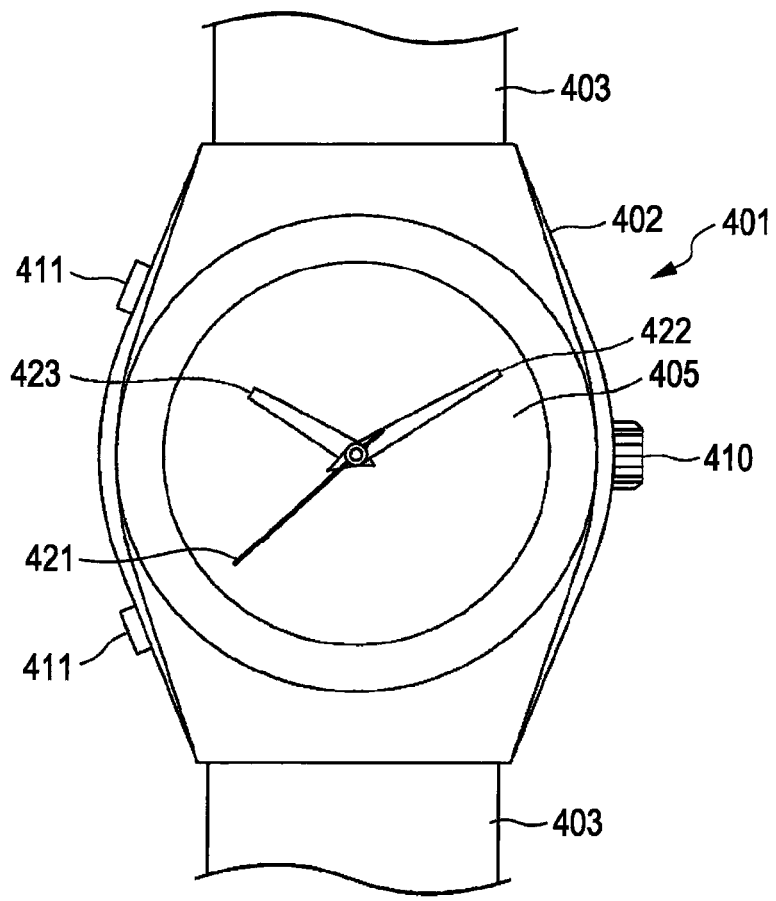
FIG. 12 is a view illustrating an example of an electronic apparatus equipped with the electrophoretic display device according to the invention.

FIG. 12A is a front view illustrating a wrist watch 401 including the electrophoretic display device 1 according to the embodiment of the invention.

The wrist watch 401 includes a watch case 402 and a pair of hands 403 connected to the watch case 402. The front face of the watch case 402 is provided with a display device 405 composed of the electrophoretic display device 1 according to the embodiment of the invention, a second hand 421, a minute hand 422, and an hour hand 423. A side face of the watch case 402 is provided with a carabiner 410 and a manipulation button 411.

Figure 12B:
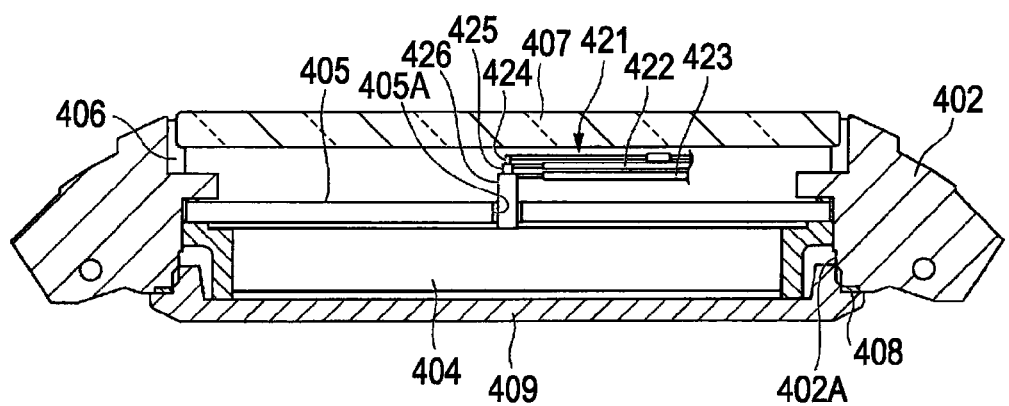

FIG. 12B is a side sectional view illustrating the wrist watch 401. The inside of the watch case 402 is provided with a receiving portion 402A. A movement mechanism 404 and a display device 405 are received in the receiving portion 402A. An end side (watch front end side) of the receiving portion 402A is provided with a transparent cover 407 made of glass or resin. The opposite end side (watch rear end side) of the receiving portion 402A engages with a cover 409 in a screwed manner via a packing 408 and the watch case 402 is sealed by the cover 409 and the transparent cover 207.

The movement mechanism 404 has a hand movement mechanism (not shown) connected to analog hands of the second hand 421, the minute hand 422, and the hour hand 423. The hand movement mechanism rotates the analog hands 421, 422, and 423 and functions as a time display portion which displays a set time.

The display device 405 is placed at the front side of the watch and in front of the movement mechanism 404, and constitutes the display portion of the write watch 401. The display surface of the display device 405 is a circular shape, but may be other shapes, such as an octagon shape or a hexadecagon shape. A center portion of the electrophoretic display device 405 is provided with a through-hole 405A which penetrates through the front to rear surface of the electrophoretic display device 405. The through-hole 405A is provided with a second pinion 424, a center wheel 425, and a scoop wheel 426 of the hand movement mechanism (not shown) of the movement mechanism 404. Leading ends of shafts are connected to the second hand 421, the minute hand 422, and the hour hand 423.

The electrophoretic display device according to the invention can be applied to other electronic apparatuses as well as the wrist watch.

Figure 13:
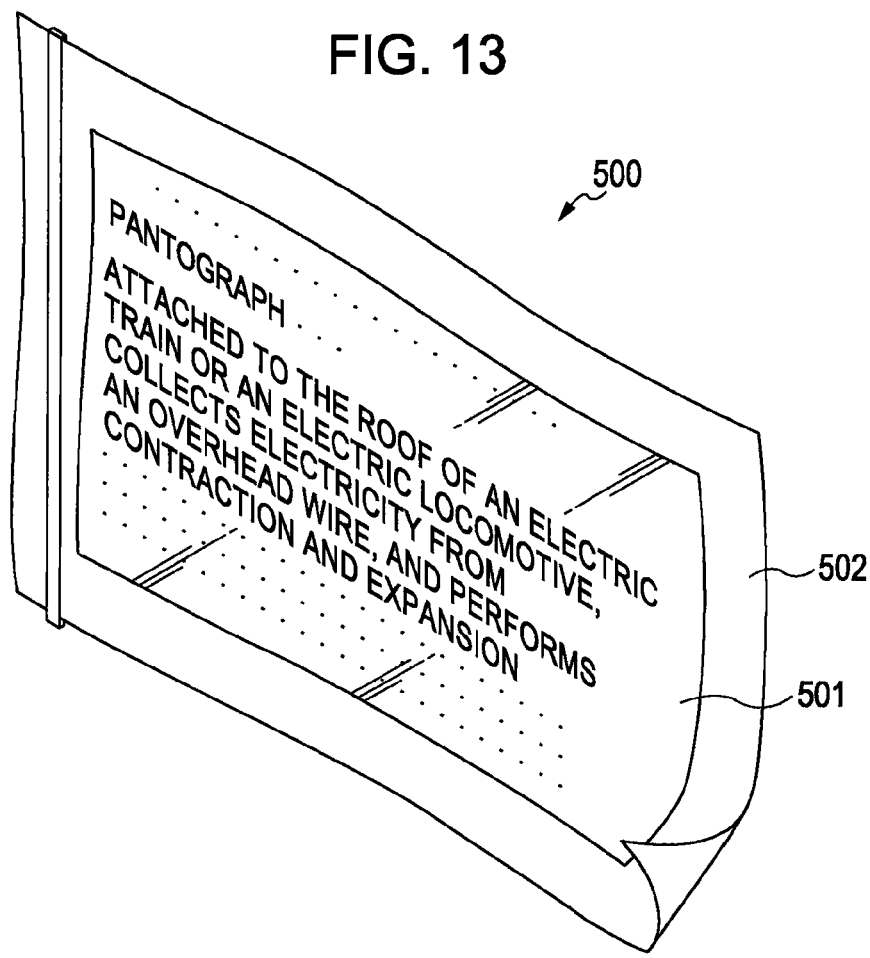
FIG. 13 is a view illustrating an example of an electronic apparatus equipped with the electrophoretic display device according to the invention.

FIG. 13 is a perspective view illustrating a structure of electronic paper 500. The electronic paper 500 is equipped with the electrophoretic display device of the invention which serves as a display portion. The electronic paper 500 has flexibility and a structure having a body 502 which is a rewritable sheet and has almost the same texture and flexibility as general paper.

Figure 14:
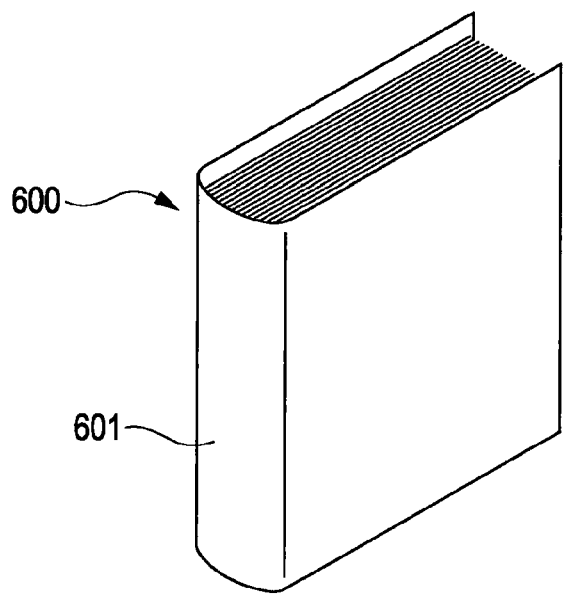
FIG. 14 is a view illustrating an example of an electronic apparatus equipped with the electrophoretic display device.

FIG. 14 is a perspective view illustrating a structure of an electronic note book 600. The electronic note book 600 is formed by filing a plurality of sheets of the electronic paper shown in FIG. 13 and interposing the file of the sheets of the electronic paper between covers 601. The cover 601 is provided with a display data input unit (not shown) by which display data sent from an external apparatus can be input. With this structure, it is possible to change and update the display contents of the electronic paper in response to the display data in a state in which the electronic paper is filed.

Each of the write watch 401, the electronic paper 500, and the electronic note book 600 which are described above includes the electrophoretic display device of the invention, and therefore has a display portion which is very reliable.

Pen Input Device (1)

Next, another embodiment of the invention will be described. In this embodiment, the electrophoretic display device is applied to an information processing system 1000 equipped with a pen input device. In this embodiment, processing of changing the display of the entire screen of the electrophoretic display device by the pen input device will be described.

Figure 15:
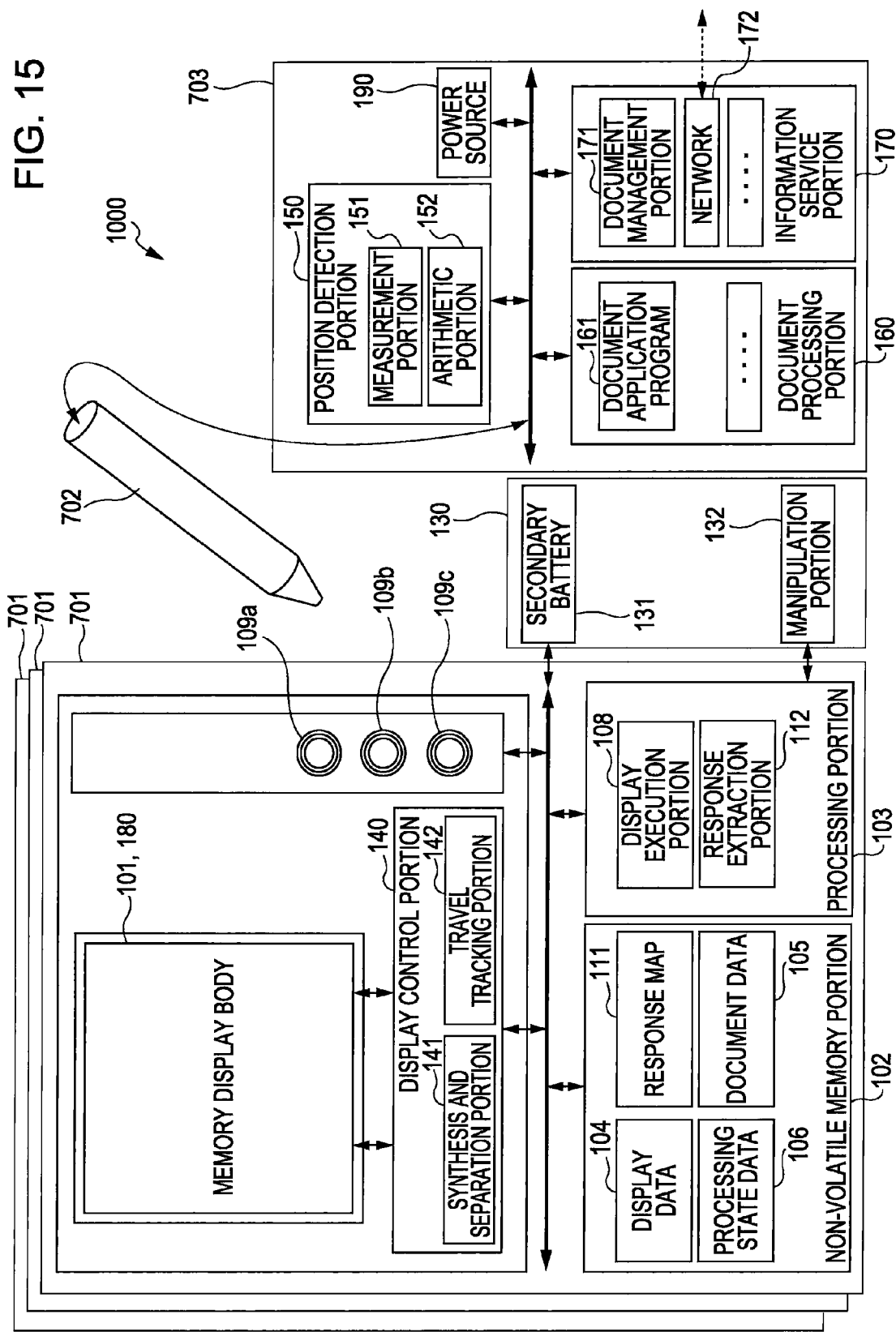
FIG. 15 is a view illustrating a structure of an information processing system according to another embodiment of the invention.

FIG. 15 is a view for explaining the information processing system 1000 according to the embodiment. A structure shown in this figure includes a host device 703 and a client device 701 which is provided for displaying and manipulating the processing result of the host device 703. In this embodiment, the host device 703 and the client device 701 can be connected by manipulation, and a plurality of client devices 701 can be used. In the host device 703, the progressing progresses in an event drive manner along with the manipulation performed with respect to the client device 701.

This embodiment is further provided with a communication unit which sends and receives signals between the host device and the client device. The communication unit of the embodiment is composed of manipulation buttons 109a, 109b, and 109c, a pen 702, which is a contact member that can contact with the manipulation buttons 109a, 109b, and 109c and is provided to the host device 703 side in a wired manner or a wireless manner, and a processing portion 103 of the client device 701 which will be described later. The processing portion 103 outputs communication information corresponding to manipulation buttons in contact with the manipulation buttons 109a, 109b, and 109c.

In this embodiment, communication is performed between the client device 701 and the host device 703 when the pen 702 and the manipulation buttons 109a, 109b, and 109c touch with each other. However, the invention is not limited to communication achieved by the touch. That is, the invention may be applied to a structure inn which the communication can be accomplished when both of the devices are in very close to each other by a predetermined distance.

The communication between the client device 701 and the host device 703 may not be limited to the communication accomplished via the manipulation buttons 109a, 109b, and 109c and the pen 702. That is, the client device and the host device may be in a state in which they can communicate with each other at any time by the connection using communication cable, such as LAN.

Hereinafter, each of the client device 701 and the host device 703 will be described.
Client Device The client device 701 is composed of a thin display and a simple device for displaying an image (including characters and diagrams) on the display. The structure composed of the display and the device is referred to as electronic paper in this embodiment.

The client 701 is provided with a memory display body 101 functioning as a display. The memory display body 101 may adopt the electrophoretic display device 1. In this embodiment, a transparent touch panel 180 is provided to the memory display body 101. The transparent touch panel 180 may have a resistor film structure in which a lattice electrode is formed on the memory display body 101 and the change of electric resistance attributable to electrical conduction at a point where an operator touches is detected.

The touch panel 180 includes a light emission portion which emits ultrasonic waves or infrared rays on the memory display body 101 and a detection portion which detects the change of ultrasonic waves or infrared rays which are generated at a position at which the pen 702 touches or is in close to the transparent touch panel 180. Alternatively, an ultrasonic surface acoustic wave type device or an infrared blocking type device which detects the position pointed by the operator using the ultrasonic save or blocking the infrared ray may be adopted. Further alternatively, a capacitance type in which the touch is detected by the change of capacitance which occurs when an operator touches the memory display body 101 with his or her fingers may be adopted.

In this embodiment, a point which shows a position detected on the transparent touch panel 180 is referred to as a touch point.

The transparent touch panel 180 serves as a position detection unit of the client device 701 which detects the position specified on the memory display body 101. In this embodiment, the position specified on the display is not limited to the point directly specified on the memory display body 101 but includes a position specified by the touch panel which is a separate body from the memory display body 101 and has a coordinate system corresponding to a coordinate system of the memory display body 101.

The position detection unit of the embodiment can use a transparent panel which has the different structure from any of the above-described transparent touch panels. However, high precision is not particularly needed for the position detection at the client device 701 side. Accordingly, as for the transparent touch panel system, all of the detection precision, the size of the device, the cost, and the lightness must be considered.

On the other hand, the manipulation buttons 109a, 109b, and 109c of the client device 701 is provided corresponding to kinds of manipulation by an operator with respect to the client device 701. The kinds of manipulation means for example, the rewrite of an image displayed on the memory display body 101 (page turning).

The manipulation buttons 109a, 109b, and 109c function as communication interface between the client device 701 and the host device 703 along with the pen 702 of the host device 703. Location communication between the manipulation buttons 109a, 109b, and 109c and the pen 702 may be performed by a light type communication using infrared rays, an electromagnetic type communication, or an electromagnetic induction type. In this embodiment, the local communication may be performed by the light type which will be described below.

That is, the manipulation buttons 109a, 109b, and 109c has an optical communication module provided with an infrared ray light receiving portion. The pen 702 includes an infrared emission portion which emits infrared rays, an infrared receiving portion which receives reflected light of the emitted infrared rays, and an imaging optical system which images the reflected light to the infrared ray receiving portion.

The manipulation buttons 109a, 109b, and 109c and the pen 702 are provided with a coil (an electromagnetic coupling portion for supplying power (power sending portion, power receiving portion)).
Antenna coils between both of the manipulation button and the pen are electromagnetically coupled to each other by pressing the pen 702 lightly against the magnetic buttons 109a, 109b, and 109c (touching), and the power is supplied to the client device 701 from the pen 702 and the host device 703. Next, the optical communication module of the manipulation buttons 109a, 109b, and 109c, the infrared emission portion of the pen 702, and the infrared receiving portion becomes a communicable state, and a signal for specifying the manipulation button which is touched by the operator is generated. In this embodiment, communication information corresponding to the signal generated from the processing portion 103 is generated and the communication information is sent to the host device 703 via the pen 702.

The embodiment designed so as to perform information input and output between the client device 701 and the host device 703 by the infrared ray consumes lower power and performs faster communication (16 Mbps), etc. than the electromagnetic induction type. Therefore, it is possible to suppress the influence on the communication in the case in which the power is supplied to the client device 701 by providing the electromagnetic coupling.

Further, in this embodiment, the device falls to the communicable state by the touch to the manipulation buttons 109a, 109b, and 109c but the touch to the client device 701 other than the manipulation buttons 109a, 109b, and 109c do not enable starting of the communication. The touch to a random position on the memory display body 101 of the client device 701 is used for only the purposes of position detection and storing of the position detection result.

That is, in this embodiment, a coordinate pattern (position information code) is preset to the memory display body 101, the pattern is irradiated the infrared ray from the infrared emission portion, and the coordinate pattern of the memory display body 101 can be optically read by the infrared receiving portion. According to this structure, it is possible to read the coordinate on the memory display device 101, which is touched by the pen 702, by the host device 703.

The client device 701 has a structure for storing and displaying the display data and includes a non-volatile memory portion 102 and a processing portion 103. The non-volatile memory portion 102 may include document data 105, processing state data 106, and a response map 111 as well as the display data 104. The display data 104 is data to be displayed as a result that the host device 703 processed the document data 105, and is received from the host device 703 and displayed on the memory display body 101. The processing state data 106 is data in which the processing of the document data 105, which is performed in the host data 703 at this time, is recorded and includes processing context information to be referenced when continuing the processing. In addition, the response map 111 is a map showing commands corresponding to the manipulation buttons 109*a*, 109*b*, and 109*c*, document elements displayed in each coordinate of the memory display body 101, and interactive elements (character string, image, link information, and execution instruction), and is made so that the client device 701 extracts the response to the manipulation without reproducing the processing state of the host device 703 and orders the host device 703 to execute the response. The response map 111 includes a response map relating to predetermined instructions allocated to the manipulation buttons 109*a*, 109*b*, and 109*c*, and a response map relating the extraction of the document elements. The response map relating to the predetermined instruction is for instructing execution of predetermined operations, and the response map relating to the extraction of the document elements is for extracting document elements or active elements (character string, image, link information, execution instruction) allocated to each coordinate position of the memory display body 101.

The processing portion 103 of the client device 701 includes a display execution portion 108 and a response extraction portion 112. The display extraction portion 108 directly controls the memory display body 101 in response to the update of the display data stored in the non-volatile memory portion 102, and displays the updated display data 104 on the memory display body 104. In greater detail, the display execution portion 108 references the display data 101, and causes the memory display body 101 to display a raster image by driving an X driver and a Y driver of the memory display body 101.

In this embodiment, the TFT type is adopted.

The response extraction portion 112 extracts the data of the command, the document element displayed on the memory display body 101, or the active element, determining whether any of the manipulation buttons 109*a*, 109*b*, and 109*c* is manipulated, or referencing a coordinate of the touch point of the pen 702 using the response map 111. Then, the extraction result is output to the document processing portion 160 of the host device 703 via the manipulation buttons 109*a*, 109*b*, and 109*c* and the pen 702.

The client device 701 of this embodiment is equipped with a display control portion 140. The display control portion 140 is equipped with a synthesis and separation portion 141 which displays a travel tracking portion 142 which draws an image on the basis of the positions detected by the transparent touch panel 180, an image drawn by the travel tracking processing portion 142, and an image based on the display data which is image data sent via the communication interface composed of the pen 702 and the manipulation buttons 109*a*, 109*b*, and 109*c* in an overlapping manner.

In the above-described structure, the travel tracking processing portion 142 functions as a client side image drawing unit and the synthesis and separation portion functions as a client side image synthesizing unit.

The travel tracking processing portion 142 draws a line by changing the pixels of the memory display body corresponding to the contact points detected by the transparent touch panel 180 to a drawing color. The image by the line (lineal drawing) is managed as an image (layer image) which is in a different layer from the display data of the non-volatile memory portion 102 in the display control portion 140. The synthesis and separation portion synthesizes the layer image of the linear image and the layer image of the display data 104 by displaying the layer image of the lineal image by the client device 701 and the layer image of the display data 104 by the host device 703 on the memory display body 101 in an overlapping manner.

Further, it is possible to separate the layer image of the lineal image by the client device 701 and the layer image of the display data 104 by the host device 703 which are displayed in the overlapping manner from each other by not displaying either one of them.

With this embodiment, the invention can give an operator an manipulation method in which an operator can add marks and explanatory remarks to the display data 104 provided by the host device 703 by displaying the layer image of the lineal image and the layer image of the display data 104 in the overlapping manner.

The travel tracking processing portion 142 may have correction information for position alignment between the transparent touch panel 180 and the memory display body 101. It is preferable that the synthesis and separation portion 141 clears the lineal image which is drawn by the travel tracking processing portion 142 after the completion of the input of the continuous travel track is confirmed and then the synthesized image which will be described later is determined by the host device 703. However, this function is not an essential function. That is, the lineal image may remain until the synthesized image is updated by the host device 703.

The travel tracking processing portion 142 is not limited to a structure in which the lineal image is drawn on the basis of the positions detected by the transparent touch panel 180 but may be a structure in which an image, such as a pointer, is drawn. According to this structure, it is possible to rapidly show the position in the electronic paper which is viewed by the operation and the execution range of the command, and therefore it is possible to improve the operability of the information processing system.

The client device 701 includes a secondary battery and a manipulation portion 132. The secondary battery is a battery pack for supplying power to each of the above-mentioned elements, and the manipulation portion 132 is a structure for directly inputting instructions to the client device 701 without intervention of the host device 703.

Host Device

The host device 703 includes a power source 190, a document processing portion 160, and an information service portion 170. The host device 703 generates the display data by the document processing portion 160 and sends the generated display data 104 to the client device 701 by the pen 702 and the manipulation buttons 109*a*, 109*b*, and 109*c*.

The document processing portion 160 has a structure of controlling the entire information processing system. Accordingly, the document processing portion 160 includes a document application program 161. The document processing portion 160 reads and executes a processing routine corresponding to the instruction which is stored in a memory in response to the instruction of various processing which is acquired via the pen 702 and the manipulation buttons 109a, 109b, and 109c. The document application program 161 is an execution program and therefore reads determination of the instruction content and processing routine corresponding to the content and executes the processing routine.

In greater detail, in the case in which an instruction of displaying a next page of the image which is being displayed in the memory display body 101 (page turning) is issued, the document application program 161 acquires the information relating to the information currently displayed in the memory display body 101, i.e. the processing state data 106 and the document data 105, from the non-volatile memory portion 102 via the pen 702 and the manipulation buttons 109a, 109b, and 109c. Next, a next page layout processing is executed on the basis of the processing state data 106 and the document data 105 and the display data 104 of a next page and the response map 111 are generated. Further, the generated data is stored in the non-volatile memory portion 102 via the pen 702 and the manipulation buttons 109a, 109b, and 109c. That is, the above-described series of processing routine is performed.

The information service portion 170 has a structure for document data which can be transmitted to the client device 701 and for using other networked resources. The host device 703 includes a position detection portion 150. The position detection portion 150 includes a measurement portion 151 and an arithmetic portion 152. The measurement portion 151 detects a coordinate pattern of points which were in touch with the pen 702 on the basis of the light receiving result of the infrared receiving portion, which is sent from the pen 702. The detected coordinate pattern is output to the arithmetic portion 152. The arithmetic portion 152 specifies the coordinate of the touch point by doing arithmetic calculation, for example, by decoding information graphic form with respect to the coordinate pattern, and sends the coordinate to the document processing portion 160.

The document processing portion 160 processes the coordinate of the touch point obtained from the position detection portion 150 according to the processing instruction of the document application program 161. This processing may be one of a variety of processing which are different according to the document application program. For example, the trail corresponding to the touch points may be processed so as to be added to the document data 105. In this case, the document processing portion 160 stores the coordinates of the touch points which are sequentially obtained in a memory at a time, and follows the instruction manipulation by the operator. If the operator touches the manipulation button 109 corresponding to confirmation of the manipulation which confirms the trail after the operator draws a series of trails while viewing the synthesized image on the client device 701, it is determined such that such manipulation is performed in the host device 703, the corresponding document application program 161 is read out, and the stored coordinate data column is processed in the document processing portion 160. At this time, in the document processing portion 160, the display data which is the result data to which the trail corresponding to the touch points is added is produced on the basis of the instruction in the document application program 161, it is instructed such that the produced display data is displayed instead of the layer image produced at the client device 701 side, and the produced display data is sent to the client device 701.

The synthesized image produced at the host device 703 side can have image quality higher than that of the synthesized image produced by overlapping the layer image with the display image. Accordingly, with this embodiment, it is possible to replace the currently display image with a subsequent synthesized image with high image quality while rapidly displaying the lineal image in the memory display body 101 right after the touch of the pen 702 from the point of view of the operability of the operator.

The reason that the image quality of the synthesized image produced in the host device 703 is higher than the image quality of the synthesized image produced in the client device 701 is that the demand for the small size and light weight structure for the position detection and the image processing in the host device 703 is not severer than that in the client device 701.

In the above-described structure, the document processing portion 160 functions as a host side image drawing unit, a host side image synthesis unit for producing the synthesized image in which the drawn image and the image data sent by the communication unit are synthesized, and a display control unit which displays the synthesized image in the memory display body 101 instead of the layer image after the layer image is displayed at the client device 701 side.

Driving Method

Next, operation of an information processing system 1000 of the embodiment and a driving method of the memory display body 101 will be described. The drive of the memory display device 101 will be described with reference to FIG. 16.

When the pen 702 contacts the surface of the touch panel 180, both of the host device 703 and the client device 701 are activated and therefore they are in the communicable state. At this time, the client device 701 is electrically connected to each of the driving circuits of the pixels 20 in the memory display body 101 (Step S11). As shown in Step S11 of FIG. 16, the low level (0V) is input to the scan line 4, the high level (4V) is input to the high potential power source line 13, and the low level (0V) is applied to the low potential power source line 14. With this operation, the latch circuit 25 is turned on, and therefore the latch circuit 25 is in a state in which it can store the image data input from the data line 5 (Step S11).

Figure 16:
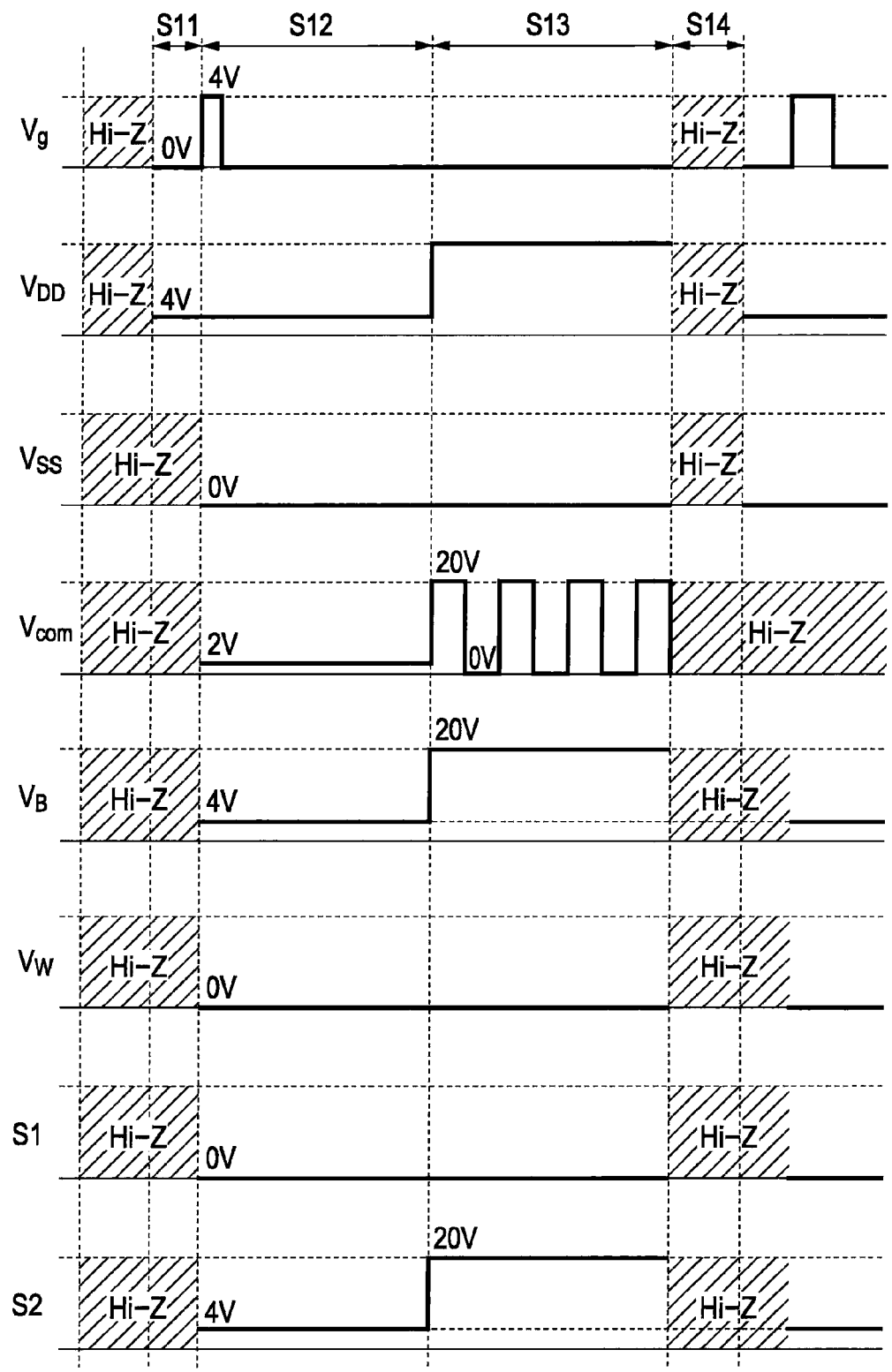
FIG. 16 is a timing chart illustrating operation of a memory display body according to one embodiment of the invention.

After that, the client device 701 supplies a midway level (2V) to the common electrode 22 (Step S12). As the common electrode 22 is supplied with the midway level (2V), the input from the pen 702 becomes effective. As shown in FIG. 16, in this embodiment, it is preferable that a period of Step S12 in which the write by the pen 702 is effective is set to time corresponding to 20 to 30 frames.

In the host device 703, contact of the pen 702 to the touch panel 180 is detected. The position detection portion 150 detects the contact position on the basis of the measurement of the light receiving signal of the infrared ray by the measurement portion 151, and detects the coordinate of the contact position by the arithmetic portion 152. The detected coordinate is temporarily stored in a buffer (not shown) as data which shows the coordinates of the contact positions.

The host device 703 performs a predetermined processing using the coordinate data of the detected positions accumulated by the document processing portion 160. The predetermined processing may be a processing of adding the coordinate data to the document. The display data 104 which is newly obtained by the addition of the coordinate data is sent to the client device 701. The client device 701 displays the image to which the transmitted display data 104 is reflected to the memory display body 101. At this time, the image signal input to the memory display device 101 includes a touch panel signal. Here, the touch panel signal means a signal corresponding to the coordinate data which is based on the contact positions by the pen 702 to the touch panel 180. For example, the touch panel signal is a signal for setting the display of the coordinate of the contact position to the black display or the white display. The touch panel signal is a signal for setting the display of pixels around the coordinate of the contact position to the black display or the white display. As a result, the memory display body 101 displays the image of the state in which the display data is written in the positions corresponding to the contact positions of the touch panel 180.

In the case in which the pen 702 is moved while it touches the touch panel 180, the above-described processing is continuously performed. As a result, the image is displayed to the memory display body 101 in the state in which the display is written to some portion of the memory display body 101, which corresponds to the trail of the contact positions on the touch panel 180.

In this manner, according to the information processing system of this embodiment, it is possible to write data in real time to the memory display body 101 which can perform a sequential display. For example, in the case in which the touch panel 180 is provided to the memory display body 101 and the writing to the touch panel 180 via the pen 702 is performed, it is possible to perform the rewriting of the display of the memory display body 101 in real time so as to follow the writing by the pen 702. With this operation, it is possible to perform an intuitive display, that is, people can feel such that the image is directly written on the memory display body 101 by the pen 702.

In this embodiment, since the $V_{com}$ is set to the midway level (2V), it is possible to improve the manipulation response. In the case in which the $V_{com}$ is set to the midway level (2V), the voltage applied to the electrophoretic particles 42 and 43 is decreased in comparison with the above-mentioned embodiment. Accordingly, the potential used when writing the data by the pen 702 can be increased in comparison with the normal data writing. For example, the normal writing is performed with 3V but input by the pen 702 can be performed with 5V.

In the case in which the electrophoretic display device which constitutes a memory display body 101 is continuously applied with the high voltage, there is a problem in that latent images remain. However, it is possible to suppress the voltage applied when inputting data using the pen 702 to a low voltage in this embodiment, it is possible to decrease the latent image. With this operation, the period corresponding to Step S12 in which the input operation by the pen 702 is in effective can be set relatively long, for example, is set to time corresponding to 20 to 30 frames.

In this embodiment, since the $V_{com}$ is set to the midway level (2V), it is possible to enable the input of the pen 702 to be the black display and the white display. In this embodiment, the touch panel signal in the case in which the input of the pen 702 is written as the black display corresponds to a first touch panel signal, and the touch panel signal in which the input of the pen 702 is written as the white display corresponds to a second touch panel signal. Here, the first touch panel signal is a signal for setting the potential of the pixel electrode 21 to a potential which is higher than the potential $V_{com}$ of the common electrode 22, and the second touch panel signal is a signal for setting the potential of the pixel electrode 21 to a potential lower than the potential $V_{com}$ of the common electrode 22. The determination by which display of the black display and the white display the writing is performed is freely set by providing a change switch to the client device and switching on and off the change switch.

In this embodiment, the triggering timing for beginning Step S11 is the time when the pen 702 touches the touch panel 180 becomes a trigger (timing), but Step S11 may begins in a different way.

Pen Input Device (2)

Figure 17:
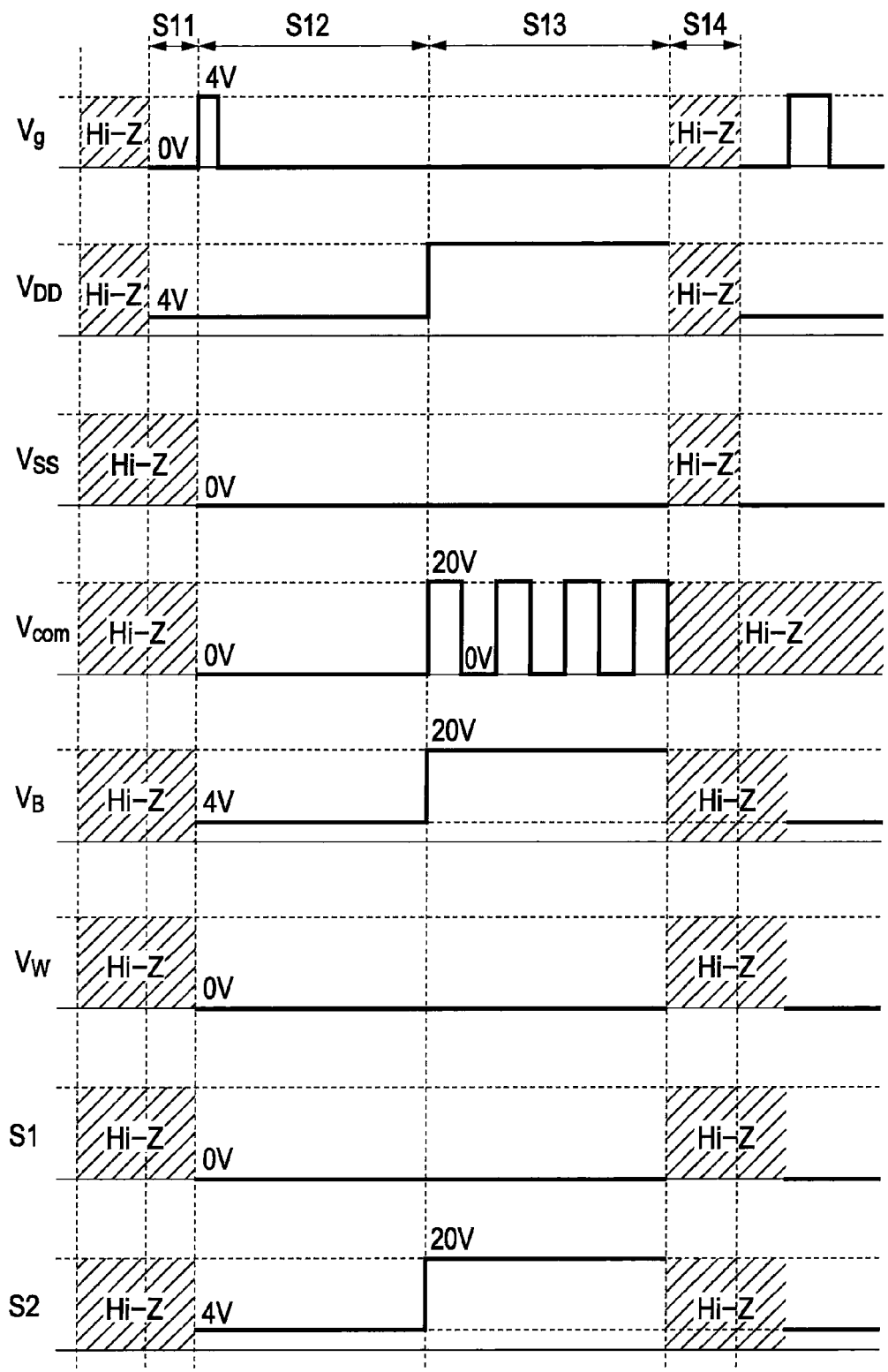
FIG. 17 is a timing chart illustrating operation of a memory display body according to another embodiment of the invention.

Next, a driving method of an information processing system 1000 equipped with a pen input device according to another embodiment of the invention will be described. FIG. 17 is a timing chart illustrating the driving method of a memory display body 101 according to the embodiment. The information processing system 1000 according to the embodiment has the same structure as the information processing time according to the above-described embodiment, and will be described below with the same references.

Like the above-mentioned information processing system 100, when the pen 702 touches the touch panel 180, both of the host device 703 and the client device 701 are activated, and becomes the communicable state. At this time, the client device 701 causes each of the wirings of the pixels 20 in the memory display body 101 to be electrically connected to the driving circuit (Step S11).

After that, the client device 701 supplies the low level (0V) to the common electrode 22 (Step S12). When the common electrode 22 is supplied with the low level (0V), the input of the pen 702 becomes effective. As shown in FIG. 17, with this embodiment, the period of Step S12 in which the writing by the pen 702 is in effective is set to the time corresponding to 20 to 30 frames.

The host device 703 detects the event that the pen 702 touches the touch panel 180, and produces the coordinate data showing the coordinate of the contact position on the basis of the contact. The host device 703 sends the coordinate data to the client device 701 as new display data. The image signal based on this display data 104 includes the touch panel signal. The display data 104 is data for inputting the high level potential (4V) to the pixel electrodes 21 corresponding to the coordinates of the contact positions and the low potential (0V) to the other pixel electrodes 21.

In the case in which the contact position moves by the pen 702, the host device 703 detects a moving direction of the contact positions on the touch panel 180 on the basis of the coordinates detected by the arithmetic portion 152. At this time, it is detected that the moving direction is any of two arrangement directions of the scan lines 4 (upward direction and downward direction in this embodiment). The host device 703 sends data relating to the moving direction to the client device 701 after detecting the moving direction.

The client device 701 inputs the transmitted display data 104 to the memory display body 101. As a result, the data line 5 connected to the memory circuit 25 corresponding to the coordinate of the contact position is supplied with the high level signal, and the other data lines 5 are applied with the low level signal. IF the scan line signal is input in this state, the pixel electrodes 21 corresponding to the coordinates of the contact positions are connected to the second control line 12 and therefore are applied with the high level. The other pixel electrodes 21 are connected to the first control line 11 and are applied with the low level.

In this embodiment, since the potential $V_{com}$ of the common electrode is the low level, migration of the electrophoretic particles 42 and 43 does not occur with respect to the pixel electrodes 21 applied with the low level. In the pixel electrodes 21 applied with the high level, the black particles 43 migrate toward the common electrode 22 and the white particles 42 migrate toward the pixel electrodes 21. Accordingly, an image in which an image formed by rewriting the black display to the pixels according to the coordinates of the contact positions is added to the previously display image is displayed.

Figure 18:
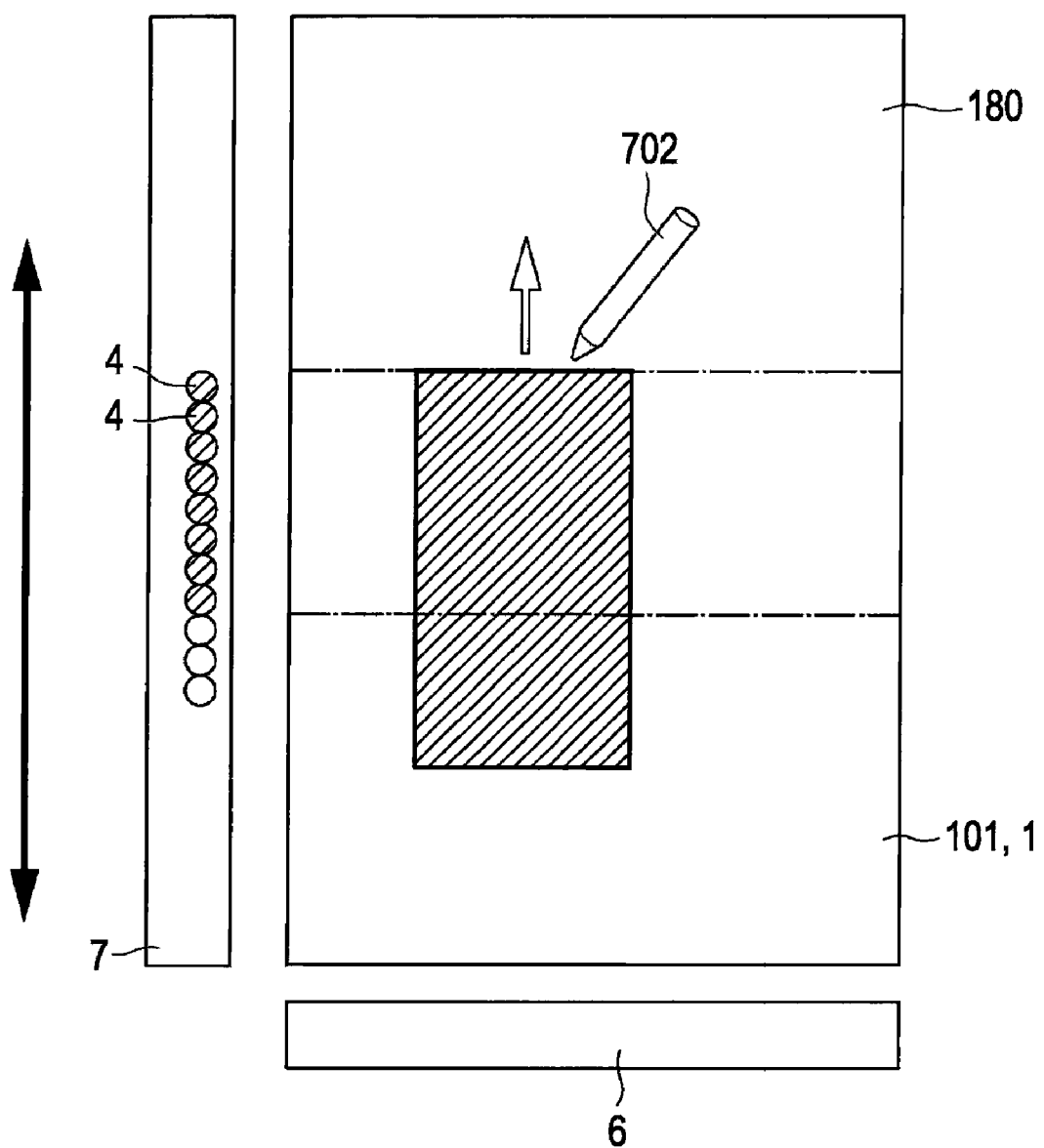
FIG. 18 is a view illustrating drive characteristics of the memory display body according to the embodiment.

At this time, the client device 701 supplies the scan signal in order to a plurality of scan lines 4 in the same direction as the moving direction (upward direction, or downward direction) of the contact position when the arrangement direction of the scan lines 4 is the reference direction. For example, as shown in FIG. 18, in the case in which the pen 702 is moved in the upward direction of the figure on the touch panel 180, the scan signal is supplied in the order form the lowermost scan line to the upper most scan line. With this operation, the detection of the contact position and the display are performed to follow the movement trail of the contact positions by the pen 702. When the above scan signal is input, as shown in FIG. 18, it is preferable that the scan signal is simultaneously supplied to the plurality of scan lines 4 (8 scan lines in FIG. 18). With this operation, the following capability with respect to the movement of the contact position of the pen 702 improves and the change of the display in the memory display body 101 is smoothly obtained. The number of scan lines 4 to which the scan signal is simultaneously supplied is not limited to 8, but may be 7 or less or 9 or more.

In the case in which the contact position on the touch panel 180 moves, a plural pieces of coordinate data of the contact positions is stored in a buffer (not shown), and a single piece of display data 104 may be produced by the plural pieces of the coordinate data. In this case, the high level is supplied to the plurality of data lines 5 in a lump. By combining this structure with the above-described example in which the plurality of scan lines is simultaneously supplied with the scan signal, it is possible to perform rewriting with respect to a range corresponding to a plurality of lines in each of up, down, left, and right sides with a single scan and therefore it is possible to greatly shorten the rewrite time and to rewrite the display in real time. The number of data lines 5 to which the high level is simultaneously supplied may be the number of scan lines to which the scan signal is simultaneously supplied, or may be different from the number of scan lines 4.

In this manner, according to this embodiment, the potential $V_{com}$ of the common electrode is set to the low level (0V) when performing the input by the pen 702, the potential of the pixel electrodes 21 corresponding to the contact positions of the touch panel 180 is set to the high level, and the potential of the other pixel electrodes 21 is set to the low level. With such an operation, it is possible to selectively perform the data write only with respect to the portion newly requiring data write. For such a reason, it is possible to reduce the power consumption and to realize fast writing.

According to this embodiment, in the case of moving the pen 702 on the touch panel 180, since the scan signal is supplied in order in a direction which follows the moving direction of the pen 702, it is possible to considerably improve the response of the scan and update the image in real time.

In the case of mounting the electrophoretic display device 1 in the information processing system 1000, when the input is performed by the pen 702, the potential $V_{com}$ of the common electrode 22 may be input with a rectangular-shaped reference pulse which is composed of a low level (0V) period and a high level (4V) period by a plurality of periods.

The entire disclosure of Japanese Patent Application Nos: 2007-315720, filed Dec. 6, 2007 and 2008-247700, filed Sep. 26, 2008 are expressly incorporated by reference herein.

What is claimed is:

1. A driving method of an electrophoretic display device composed of a pair of substrates with electrophoretic elements, each containing electrophoretic particles, interposed therebetween, first electrodes provided on one substrate of the pair of substrates so as to correspond to pixels, and a second electrode which is provided on the other substrate and is shared by all of the pixels, in which each pixel includes a pixel switching element connected to a scan line and a data line, a memory circuit connected to the pixel switching element, and a switch circuit disposed between the memory circuit and the first electrode, and the switch circuit is connected to a first control line and a second control line, the driving method comprising:

inputting an image signal to the memory circuit via the pixel switching element;

causing the first control line and the second control line to be connected to the first electrode by driving the switch circuit in response to an output from the memory circuit;

causing a potential of the second electrode to alternate between a first potential and a second potential in a state in which a potential of the first control line is set to the first potential and a potential of the second control line is set to the second potential; and setting the potential of the first control line to a third potential which is higher than the first potential in an image display step which is performed after the inputting an image signal.

2. The driving method of an electrophoretic display device according to claim 1, wherein the pixels are arranged in a matrix, and the potential of the second electrode changes in synchronous with the inputting of an image signal with respect to the pixels belonging to a single line or a plural number of lines in the matrix of the plurality of pixels in the inputting an image signal.

3. The driving method of an electrophoretic display device according to claim 1, wherein a potential of the first electrode changes from the second potential to the first potential when a potential of the second electrode is the first potential, and the potential of the first electrode changes from the first potential to the second potential when the potential of the second electrode is the second potential, in inputting an image signal.

4. The driving method of an electrophoretic display device according to claim 1, wherein the electrophoretic display device is provided with a touch panel, the image signal includes a touch panel signal which changes the potential of the first electrode at a contact position on the touch panel, and the touch panel signal is supplied to the memory circuit in inputting an image signal.

5. The driving method of an electrophoretic display device according to claim 4, wherein the touch panel signal is selected from a first touch panel signal which sets the potential of the first electrode to be higher than the potential of the second electrode and a second touch panel signal which sets the potential of the first electrode to be lower than the potential of the second electrode.

6. The driving method of an electrophoretic display device according to claim 4, wherein the touch panel signal is supplied in a state in which the potential of the second electrode and the potential of the first control line are set to the same level in inputting an image signal.

7. The driving method of an electrophoretic display device according to claim 4, wherein a plurality of scan lines is arranged in a first direction, and scan signals are supplied in turns to the plurality of scan lines in the same direction as a shift direction of the contact position in the case in which the contact position is shifted during the inputting an image signal.

8. The driving method of an electrophoretic display device according to claim 7, wherein a plurality of data lines is arranged in a second direction, and the touch panel signals are simultaneously supplied to the plurality of data lines.

9. A driving method of an electrophoretic display device composed of a pair of substrates with electrophoretic elements, each containing electrophoretic particles, interposed therebetween, first electrodes provided on one substrate of the pair of substrates so as to correspond to pixels, and a second electrode which is provided on the other substrate and is shared by all of the pixels, in which each pixel includes a pixel switching element connected to a scan line and a data line, a memory circuit connected to the pixel switching element, and a switch circuit disposed between the memory circuit and the first electrode, and the switch circuit is connected to a first control line and a second control line, the driving method comprising:

inputting an image signal to the memory circuit via the pixel switching element;

causing the first electrode to be connected to the first control line or the second control line by driving the switch circuits in response to an output from the memory circuit; and setting a potential of the second electrode to a midway potential between a first potential and a second potential in a state in which a potential of the first control line is set to the first potential and a potential of the second control line is set to the second potential.

10. The driving method of an electrophoretic display device according to claim 9, wherein the potential of the second electrode varies within a range of ±30% with respect to the midway potential between the first potential and the second potential.

* * * * *